US012773945B2

(12) United States Patent
Koyle et al.

(10) Patent No.: US 12,773,945 B2
(45) Date of Patent: Oct. 27, 2026

(54) LAMP ASSEMBLY WITH QUICK CONNECT MOUNT

(71) Applicant: DRAGONFISH TECHNOLOGIES LLC, Galesburg, MI (US)

(72) Inventors: Kevin Koyle, Delton, MI (US); Patrick Condon, Augusta, MI (US); Mark Williams, Kalamazoo, MI (US); Timothy Chadderdon, Vicksburg, MI (US); Jeffrey Leverton, Kalamazoo, MI (US); Mark Pruss, Delton, MI (US)

(73) Assignee: DRAGONFISH TECHNOLOGIES LLC, Galesburg, MI (US)

( * ) Notice: Subject to any disclaimer, the term of this patent is extended or adjusted under 35 U.S.C. 154(b) by 0 days.

(21) Appl. No.: 19/245,670

(22) Filed: Jun. 23, 2025

(65) Prior Publication Data

US 2025/0319812 A1 Oct. 16, 2025

Related U.S. Application Data

(62) Division of application No. 17/897,547, filed on Aug. 29, 2022, now Pat. No. 12,358,419.

(51) Int. Cl.
*B60Q 1/26* (2006.01)

(52) U.S. Cl.
CPC .................................. *B60Q 1/2615* (2013.01)

(58) Field of Classification Search
CPC .. B60Q 1/0441; B60Q 1/2615; B60Q 1/2623; B60Q 1/263; B60Q 1/2634
USPC ................ 362/396, 549, 647, 652, 655, 656
See application file for complete search history.

(56) References Cited

U.S. PATENT DOCUMENTS

| | | | | | |
|---|---|---|---|---|---|
| 3,375,367 | A * | 3/1968 | Woodcock | F21S 45/10 | 362/382 |
| 3,814,928 | A * | 6/1974 | Grosseau | F16B 2/06 | 248/222.12 |
| 4,532,578 | A * | 7/1985 | Gaden | B60Q 1/2607 | 362/544 |
| 4,972,301 | A | 11/1990 | Kasboske | | |
| 2009/0175048 | A1 * | 7/2009 | Hwang | B60Q 1/30 | 362/523 |
| 2014/0293637 | A1 * | 10/2014 | Datz | B60Q 1/263 | 362/546 |

FOREIGN PATENT DOCUMENTS

| | | |
|---|---|---|
| GB | 176637 | 3/1922 |
| WO | 2020051606 | 11/1990 |

* cited by examiner

*Primary Examiner* — Thomas M Sember
(74) *Attorney, Agent, or Firm* — Miller Canfield

(57) ABSTRACT

A lamp body to be releasably coupled to a mounting surface. The lamp body comprises a mount post and a cantilevered lock. The mount post is configured to be received in a mounting hole in the mounting surface, where the mount post is configured to slide between a releasing portion of the mounting hole and a locking portion of the mounting hole. The cantilevered lock is configured to releasably engage with a stop on the mounting surface when the mount post slides into the locking portion of the mounting hole to retain the mount post within the locking portion of the mounting hole.

13 Claims, 18 Drawing Sheets

FIG. 2
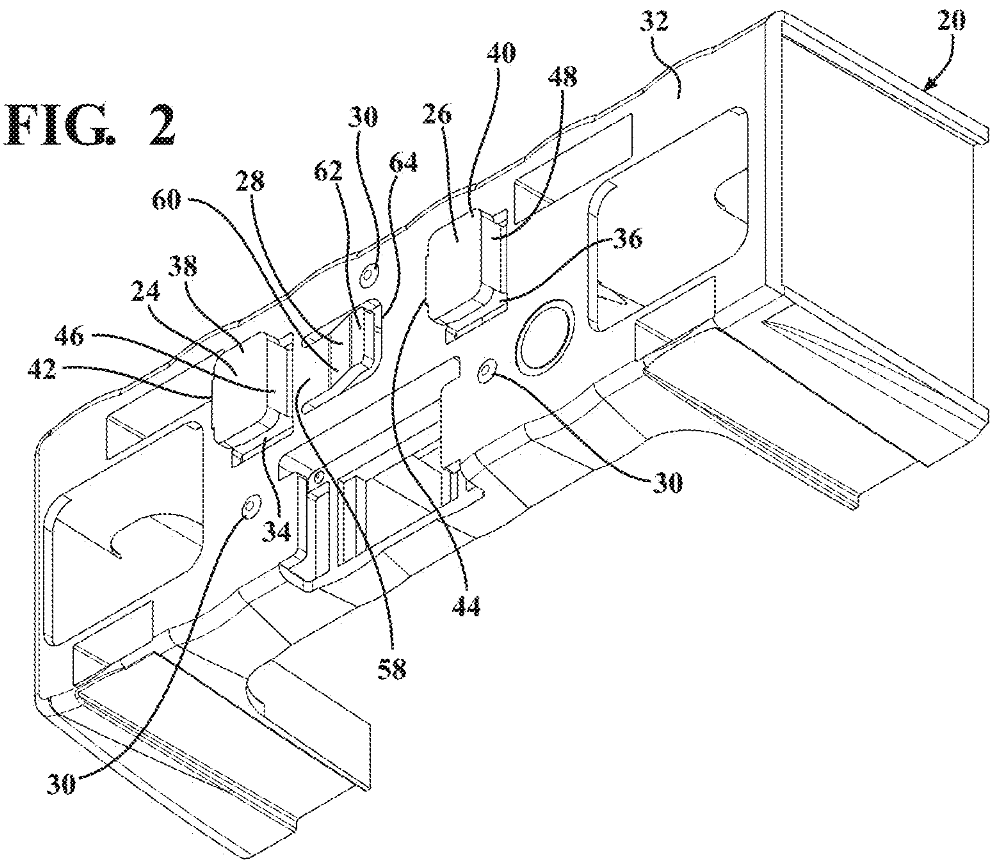
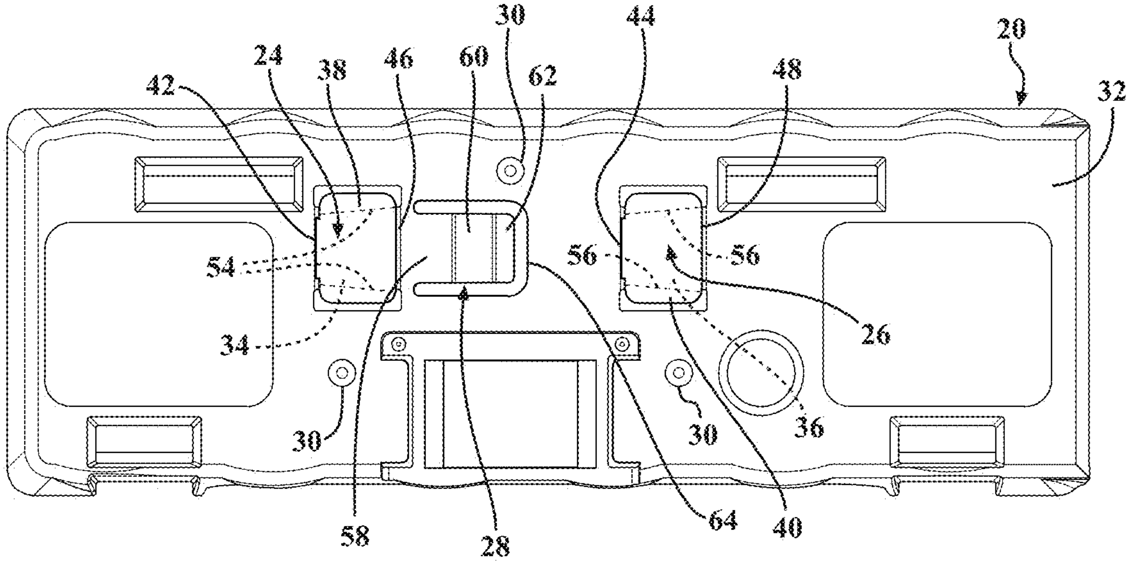
FIG. 3

LAMP ASSEMBLY WITH QUICK CONNECT MOUNT

BACKGROUND OF THE INVENTION

1. Field of the Invention

The present invention relates to a mounting system for mounting a lamp assembly to a truck, trailer or other vehicle. More particularly, the invention relates to a quick connect mount for mounting a lamp assembly to trailer without the use of secondary mechanical fasteners.

2. Description of Related Art

Various lamp assemblies are known that are suitable for attachment to a utility trailer, marine trailer, and other types of vehicles. When used on public roads, vehicles are typically required to include lamp assemblies to indicate the position and intended movement of the vehicle. For example, lamp assemblies may be configured to relay information about movement of the vehicle, such as decreasing the vehicle speed or changing the direction of vehicle travel. Lamp assemblies may also be illuminated after dark to alert others to the presence of the vehicle.

Lamp assemblies are typically mounted to a trailer using a mechanical fastener, such as a threaded bolt or screw. For example, U.S. Pat. No. 3,831,018 discloses a threaded mechanical fastener used to mount a lamp assembly to a utility trailer. However, the use of threaded mechanical fasteners to couple lamp assemblies to trailers adds cost and complexity as well as adding an additional point of corrosion. It is therefore desirable to eliminate threaded mechanical fasteners to reduce the cost of lamp assemblies as well as reduce the time to assemble and disassemble these components.

It is also desirable to install the lamp assembly with a retention force such that it cannot be dislodged by impact during normal use, but can be released easily for repair or replacement. It is therefore desirable for the lamp assembly to be installed easily without additional hardware, have a positive lock when installed fully and to further have a simple release mechanism which allows for removal of the lamp assembly for service or replacement. It is also desirable in some instances to include a water resistant seal when the lamp assembly is mounted to the vehicle.

SUMMARY OF THE INVENTION

According to one embodiment, there is provided a lamp body to be releasably coupled to a mounting surface. The lamp body comprises a mount post and a cantilevered lock. The mount post is configured to be received in a mounting hole in the mounting surface, where the mount post is configured to slide between a releasing portion of the mounting hole and a locking portion of the mounting hole. The cantilevered lock is configured to releasably engage with a stop on the mounting surface when the mount post slides into the locking portion of the mounting hole to retain the mount post within the locking portion of the mounting hole.

According to another embodiment, there is provided a lamp assembly comprising a mounting surface and a lamp body. The mounting surface has a mounting hole and a stop. The mounting hole includes a releasing portion and a locking portion. The lamp body has a mount post and a cantilevered lock. The mount post is configured to be received in the mounting hole in the mounting surface. The mount post is configured to slide between the releasing portion of the mounting hole and the locking portion of the mounting hole. The cantilevered lock is configured to releasably engage with the stop on the mounting surface when the mount post slides into the locking portion of the mounting hole to retain the mount post within the locking portion of the mounting hole.

According to another embodiment, there is provided a lamp body to be releasably coupled to a mounting surface. The lamp body comprises a mounting wall and a plurality of snap features. The mounting wall has a rear surface. The plurality of snap features project from the rear surface. The plurality of snap features is aligned in a row. Alternating snap features extend from opposite sides of the row. Each snap feature is configured to releasably engage with a mounting hole in the mounting surface.

According to another embodiment, there is provided a lamp assembly comprising a mounting surface and a lamp body. The mounting surface has a mounting hole. The lamp body has a mounting wall with a rear surface and a plurality of snap features projecting from the rear surface. Each snap feature is configured to releasably engage with the mounting hole in the mounting surface.

BRIEF DESCRIPTION OF THE DRAWINGS

Advantages of the present invention will be readily appreciated as the same becomes better understood by reference to the following detailed description when considered in connection with the accompanying drawings wherein:

FIG. 2 is a rear, bottom perspective view of a lamp body, according to one embodiment of the present invention;

FIG. 3 is a rear view of the lamp body of FIG. 2;

DETAILED DESCRIPTION OF THE EMBODIMENTS

FIGS. 1-44 illustrate a lamp assembly 10 according to embodiments described herein. Directional references employed or shown in the description, figures, or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
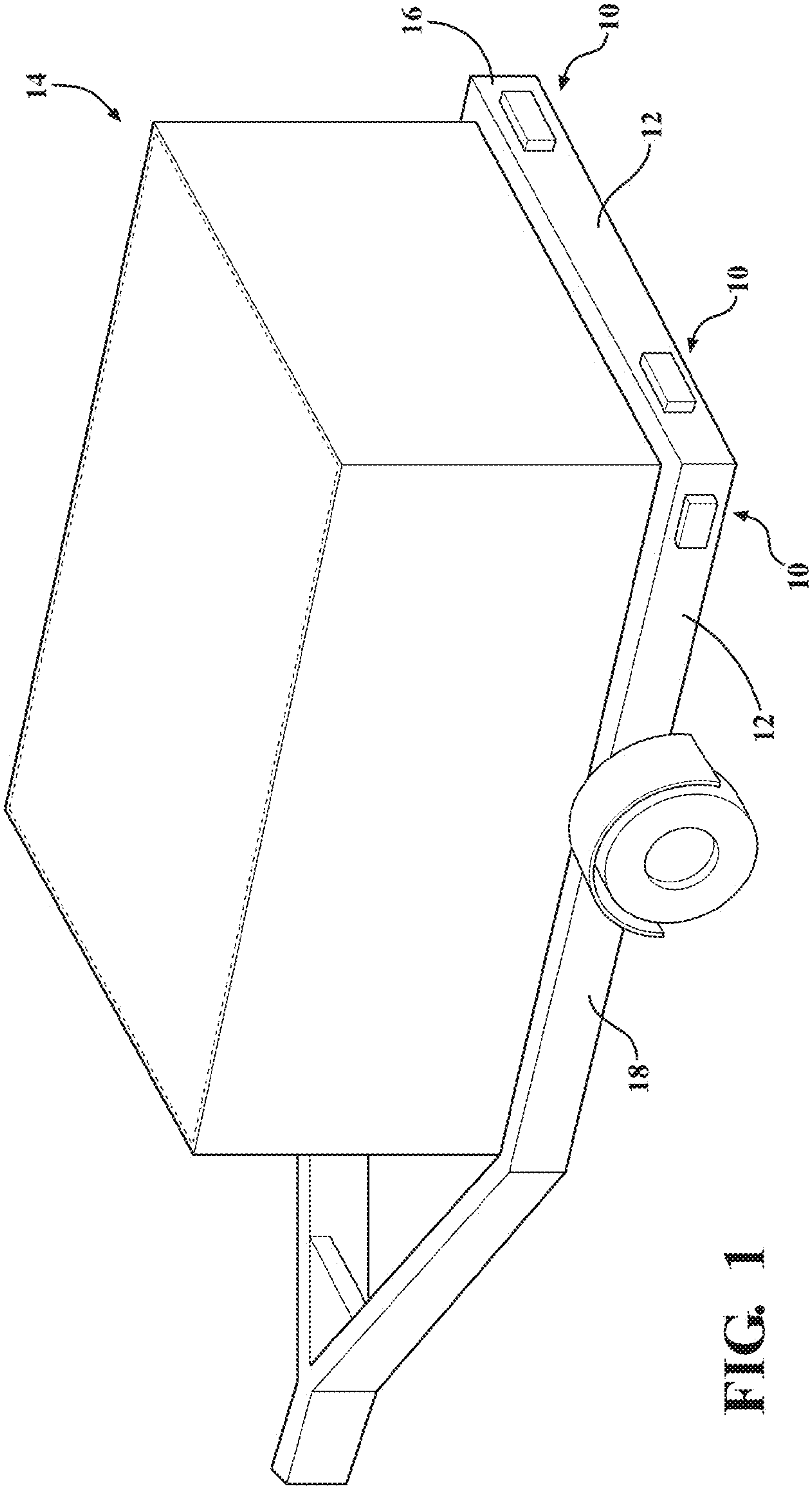
FIG. 1 is a perspective view of a trailer with lamp assemblies according to one embodiment of the present invention.
Figure 4:
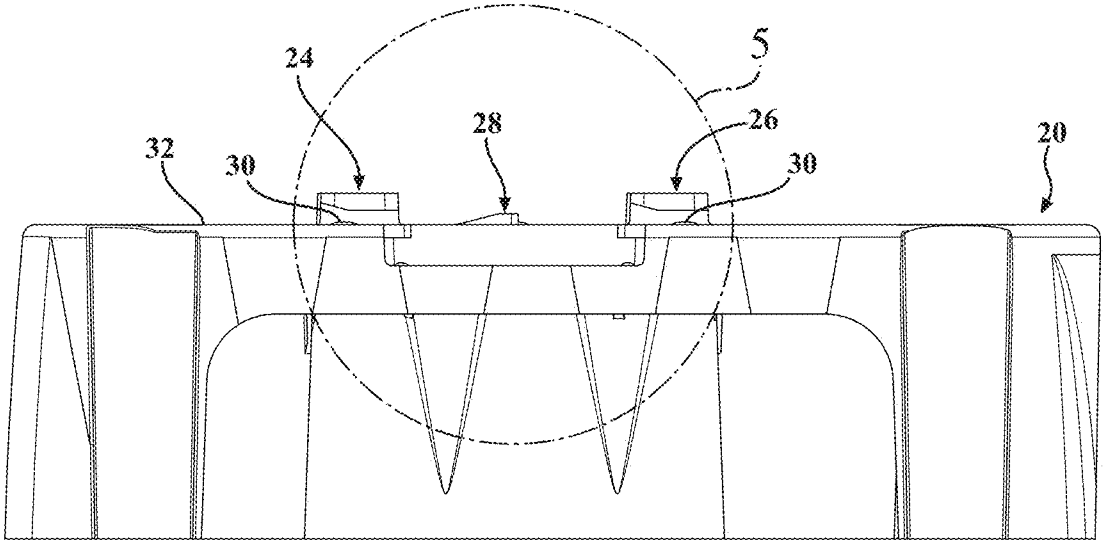
FIG. 4 is a bottom view of the lamp body of FIG. 2.
Figure 5:
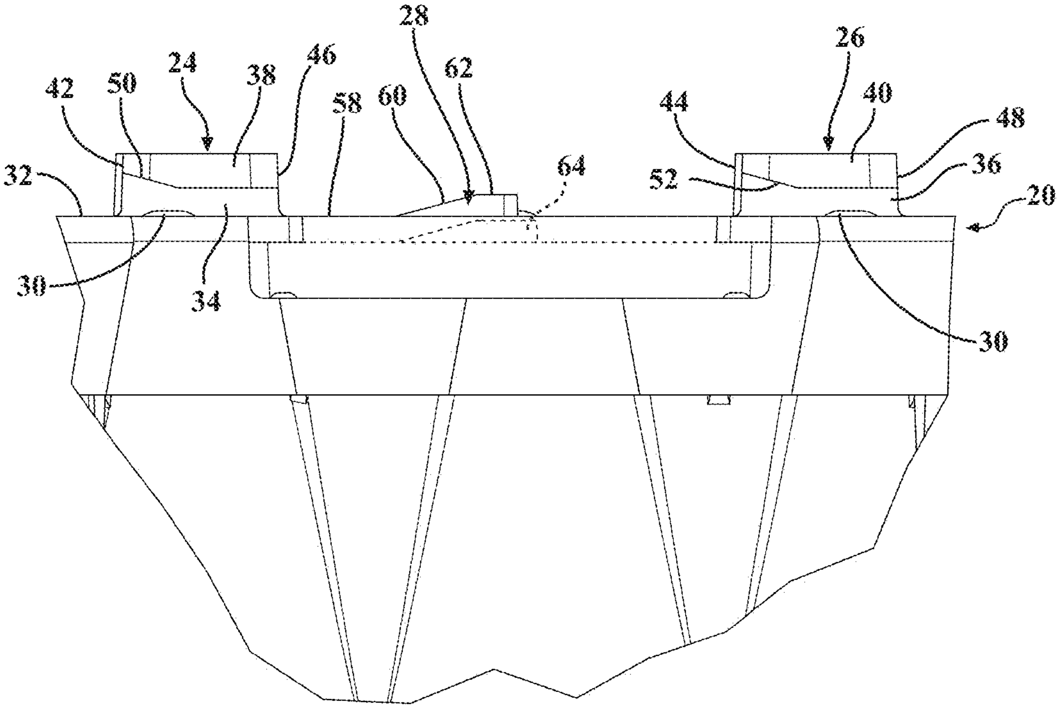
FIG. 5 is an enlarged fragmentary view of a portion of the lamp body of FIG. 4.

As depicted in FIG. 1, the lamp assembly 10 may be attached to a frame member 12 on a trailer 14. The lamp assemblies 10 may be mounted on the back 16 or the side 18 of the trailer frame 12 to relay information about the location and/or intended change in direction and/or speed of the trailer 14. It should be appreciated that the lamp assembly 10 may be mounted on any type of trailer, i.e., open utility trailer, enclosed cargo trailer, boat trailer, etc. Although depicted on a trailer 14, it will be understood that the lamp assembly 10 may also be mounted on any vehicle without departing from the scope of the present invention.

Referring to FIGS. 2-16, the lamp assembly 10 includes a lamp body 20 configured to be releasably coupled to a mounting bracket 22. The mounting bracket 22 is configured to be fixedly coupled to the trailer frame 12 by welding, bolting, riveting, or other attachment methods. FIGS. 2 and 3 show rear views of the lamp body 20 to illustrate the components used to mount the lamp body 20 onto the mounting bracket 22. Although the lamp body 20 is depicted as having a generally rectangular cuboid shape, it will be understood that the general shape of the lamp body 20 can vary among different embodiments without departing from the scope of the present invention.

Referring to FIGS. 2-7, the lamp body 20 includes a plurality of mount posts 24, 26, a cantilevered lock 28, and a plurality of spaced apart protrusions 30 projecting from a rear surface 32. Although depicted with three protrusions 30, it will be understood that any number of protrusions 30 at any position on the rear surface 32, with any given size and shape may be included without departing from the scope of the present invention. Each of the mount posts 24, 26 includes a base portion 34, 36 projecting from the rear surface 32 and a cantilever ledge 38, 40 extending longitudinally from the base portion 34, 36. Each cantilever ledge 38, 40 is generally rectangular shaped in profile with a leading edge 42, 44 and a trailing edge 46, 48.

Figure 6:
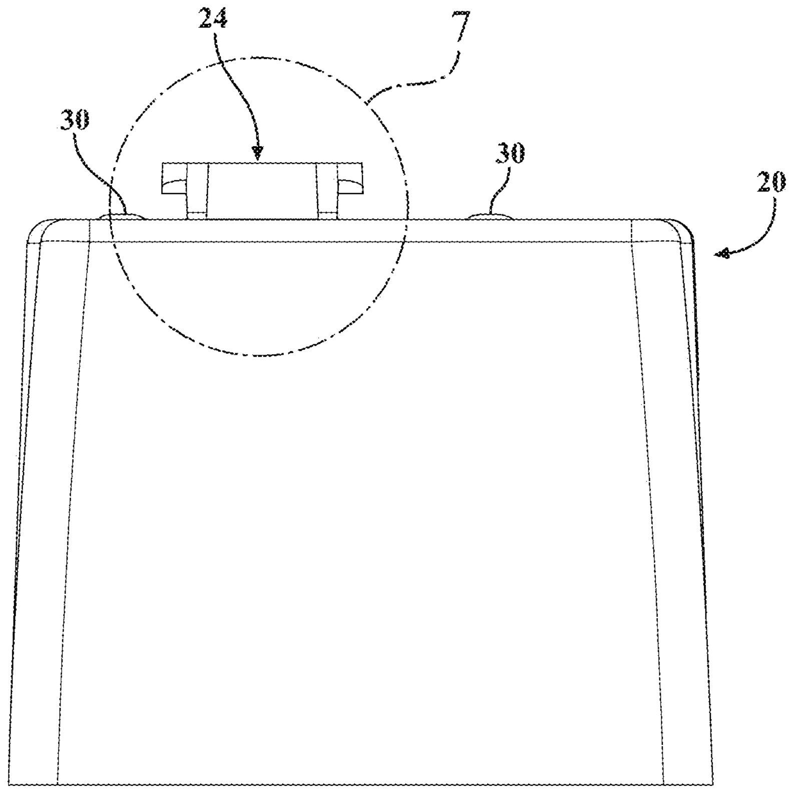
FIG. 6 is a side view of the lamp body of FIG. 2.
Figure 7:
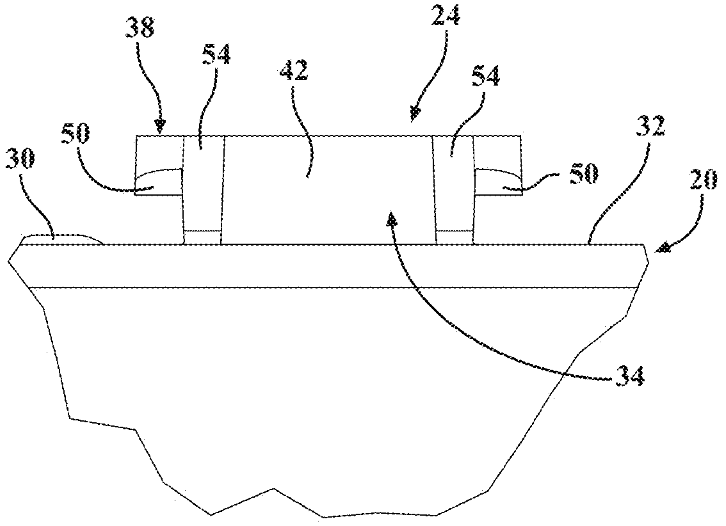
FIG. 7 is an enlarged view of a portion of the lamp body of FIG. 6.
Figure 14:
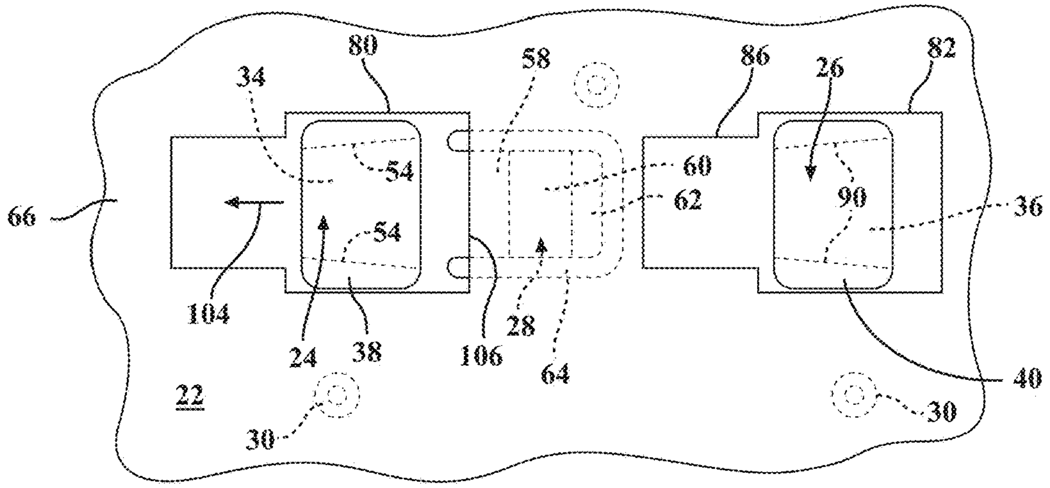
FIG. 14 is an enlarged rear view of a portion of the lamp assembly of FIG. 11.

As best shown in FIGS. 4-7, each cantilever ledge 38, 40 includes a tapered lead-in portion 50, 52 extending along an inner surface of the leading edge 42, 44 of the cantilever ledge 38, 40. As best shown in FIGS. 6-7 and 14 (in phantom), each base portion 34, 36 includes opposing tapered side walls 54, 56 where the distance between the side walls 54, 56 is smaller toward the leading edge 42, 44 and greater toward the trailing edge 46, 48.

Referring to FIGS. 2-3, the cantilevered lock 28 is integrally formed with the rear surface 32 adjacent the trailing edge 46 of the mount post 24. The cantilevered lock 28 includes a hinge portion 58 extending from the rear surface 32, an angled portion 60 extending from the hinge portion 58, and terminates with a locking tab 62 extending from the angled portion 60. The locking tab 62 is generally parallel to the rear surface 32.

Referring to FIG. 3, a U-shaped slot 64 formed in the rear surface 32 extends around the cantilevered lock 28 such that the cantilevered lock 28 can flex into the slot 64 during assembly of the lamp body 20 with the mounting bracket 22. It will be understood that the general shape of the cantilevered lock 28 can vary without altering the scope of the invention.

Figure 8:
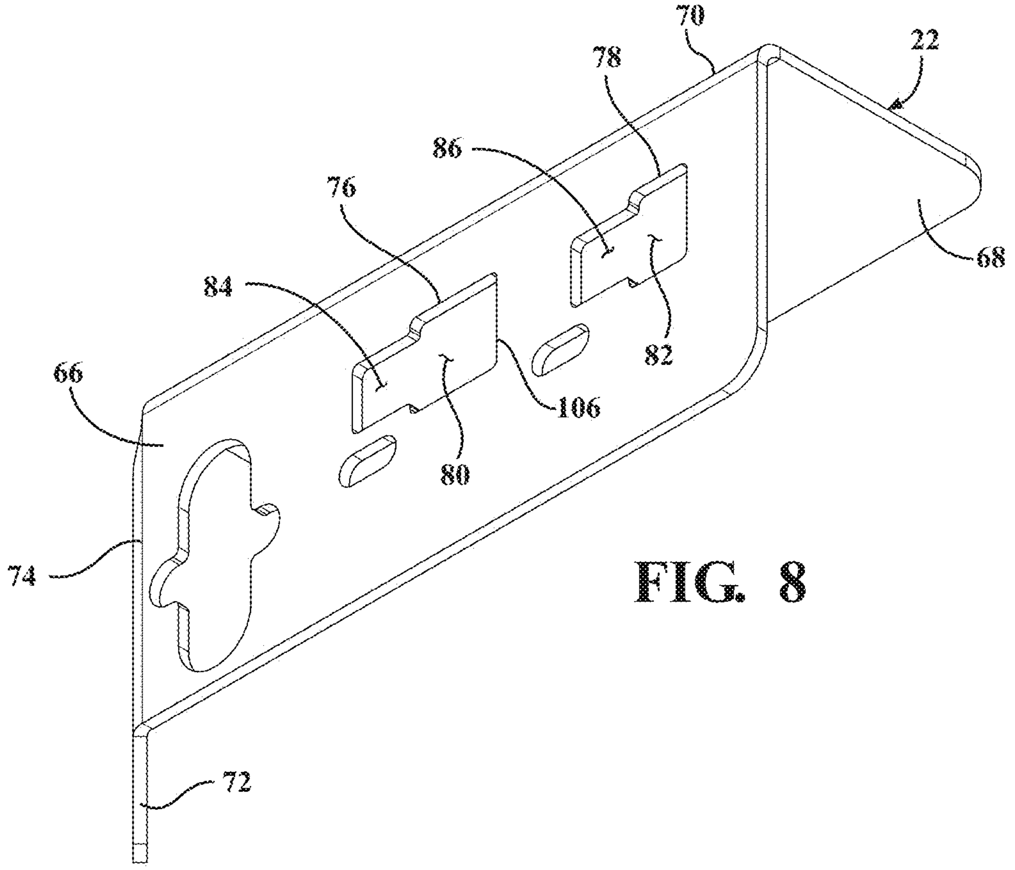
FIG. 8 is a rear, bottom perspective view of a mounting bracket, according to one embodiment of the present invention.
Figure 9:
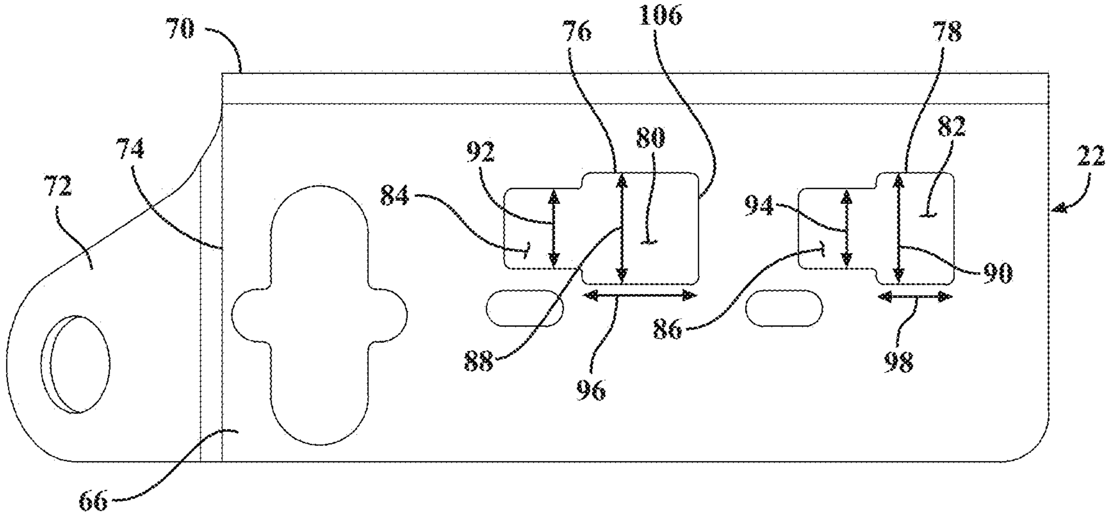
FIG. 9 is a rear view of the mounting bracket of FIG. 8.

Referring to FIGS. 8 and 9, the mounting bracket 22 includes a mounting wall 66, a support wall 68 projecting at a 90 degree angle from a top end 70 of the mounting wall 66 and a secondary flange 72 extending at an angle from a side end 74 of the mounting wall 66. Although the mounting wall 66 is generally rectangular in shape, the shape of the mounting wall 66 can vary without altering the scope of the invention. The support wall 68 and/or the secondary flange 72 may be configured to be fixedly coupled to a trailer frame 12 by one or more mechanical fasteners, welding, and/or adhesive, as non-limiting examples. Alternatively, the support wall 68 and secondary flange 72 can be omitted, and the mounting wall 66 can be integrally formed with a vehicle surface or a vehicle component to form a mounting surface on the vehicle/vehicle component without departing from the scope of the invention.

The mounting wall 66 includes spaced apart mounting holes comprising keyhole slots 76, 78. Each keyhole slot 76, 78 includes a releasing portion 80, 82 adjoining a locking portion 84, 86. The releasing portions 80, 82 have widths 88, 90 that are greater than widths 92, 94 of the locking portions 84, 86. The releasing portion 80 in keyhole slot 76 has a length 96 that is greater than a length 98 of the releasing portion 82 in keyhole slot 78 to accommodate the cantilevered lock 28 when the lamp body 20 is mounted on the mounting bracket 22, as will be discussed further below. An end wall 106 on the keyhole slot 76 forms a stop for the cantilevered lock 28. The size and shape of the keyhole slots 76, 78 can vary without altering the scope of the invention. In alternate embodiments, the mounting wall 66 is a vehicle mounting surface 66 integrally formed with a component of a vehicle without departing from the scope of the present invention.

A gasket and/or a seal can be optionally included in the lamp assembly 10 in order to prevent liquid ingress into the lamp body 20, without departing from the scope of the invention. Alternatively, a gasket and/or a seal can be assembled between the lamp body 20 and the mounting bracket 22 when the lamp body 20 is mounted to the mounting bracket 22 without departing from the scope of the invention.

Figure 10:
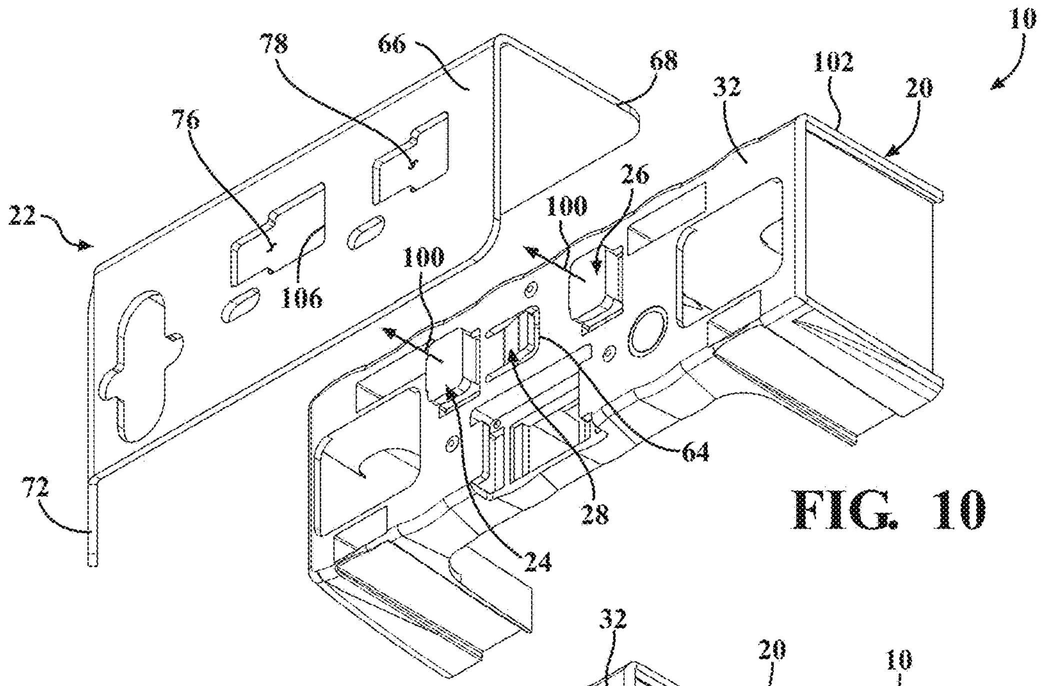
FIG. 10 is a rear, bottom perspective exploded view of the lamp assembly according to one embodiment of the present invention before the lamp body is mounted on the mounting bracket.
Figure 11:
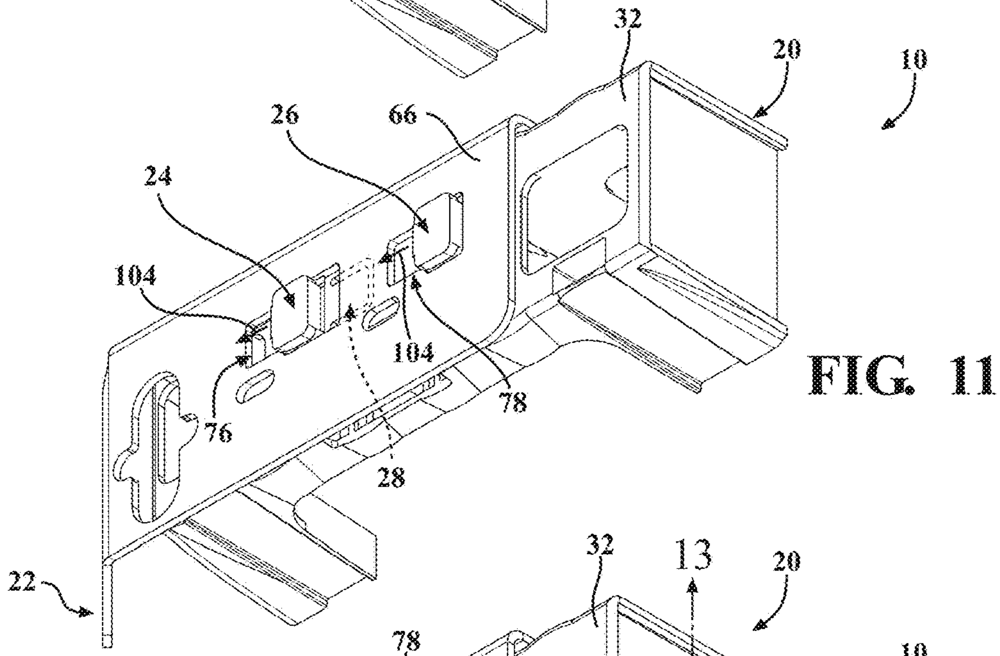
FIG. 11 is a rear, bottom perspective view of the lamp assembly of FIG. 10 with the lamp body partially mounted on the mounting bracket.
Figure 12:
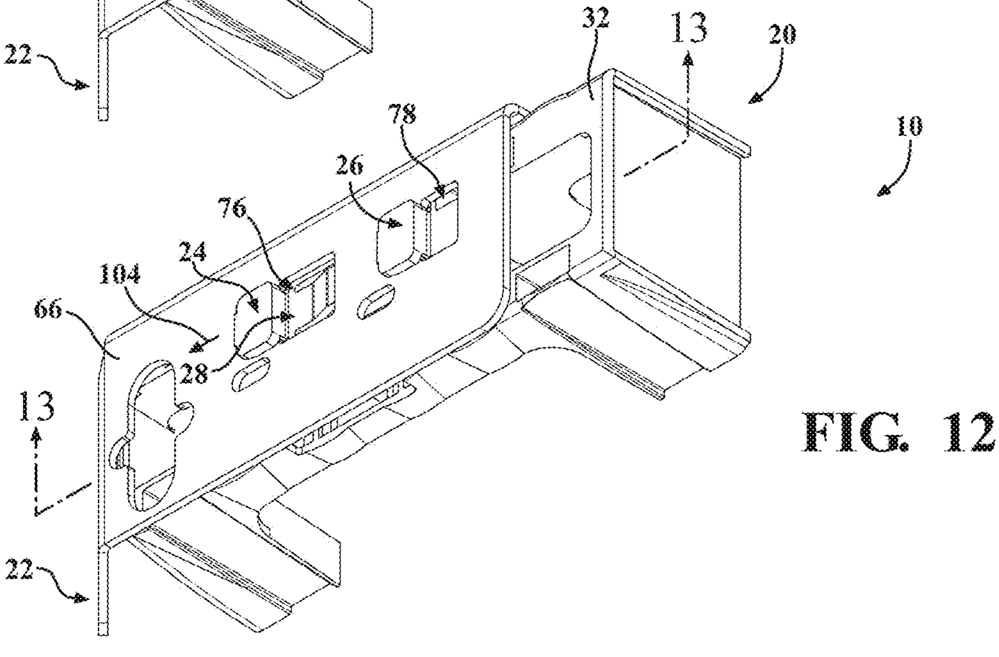
FIG. 12 is a rear, bottom perspective view of the lamp assembly of FIG. 10 with the lamp body fully mounted on the mounting bracket.

Referring to FIG. 10, to mount the lamp body 20 onto the mounting bracket 22, the lamp body 20 is moved in the direction of arrows 100 toward the mounting bracket 22. Referring to FIGS. 11 and 14, the mount posts 24, 26 on the lamp body 20 are then inserted into the releasing portions 80, 82 of keyhole slots 76, 78. The top 102 of the lamp body 20 can be aligned with the support wall 68 of the mounting bracket 22 to ensure that the mount posts 24, 26 are laterally aligned with the keyhole slots 76, 78. The cantilever ledges 38, 40 of the mount posts 24, 26 are sized and shaped such that they can pass through the releasing portions 80, 82 of the respective keyhole slots 76, 78. When the mount posts 24, 26 are inserted into the releasing portions 80, 82 of the keyhole slots 76, 78, the cantilevered lock 28 abuts the lower surface of the mounting wall 66 between the keyhole slots 76, 78. The U-shaped slot 64 extending around the cantilevered lock 28 allows the cantilevered lock 28 to flex away from the mounting wall 66 when the cantilevered lock 28 contacts the mounting wall 66, and induces a spring bias in the cantilevered lock 28.

To lock the lamp body 20 onto the mounting bracket 22, the lamp body 20 is moved in the longitudinal direction (see arrows 104) so that the leading edges 42, 44 of the cantilever ledges 38, 40 moves over the locking portions 84, 86 of the keyhole slots 76, 78. The tapered lead-in portions 50, 52 help to guide the cantilever ledges 38, 40 over the mounting bracket 22. Because the tapered side walls 54, 56 of the base portions 34, 36 are narrower toward the leading edges 42, 44, as the base portions 34, 36 move further into the locking portions 84, 86, they create a frictional fit within the locking portions 84, 86 of the keyhole slots 76, 78 to take up any tolerance slack.

Figure 15:
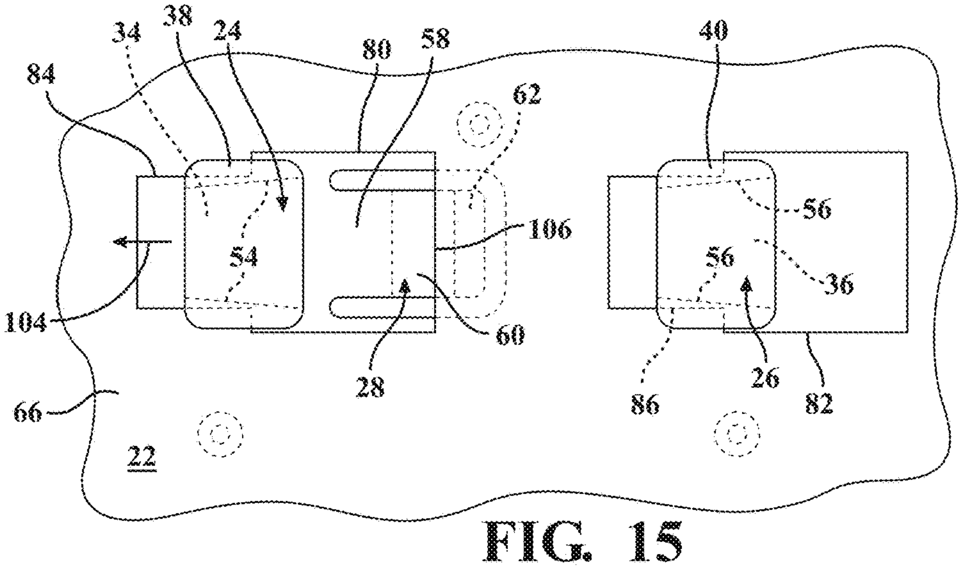
FIG. 15 is the lamp assembly of FIG. 14 with mount posts repositioned within the respective keyhole slots of the mounting bracket.
Figure 16:
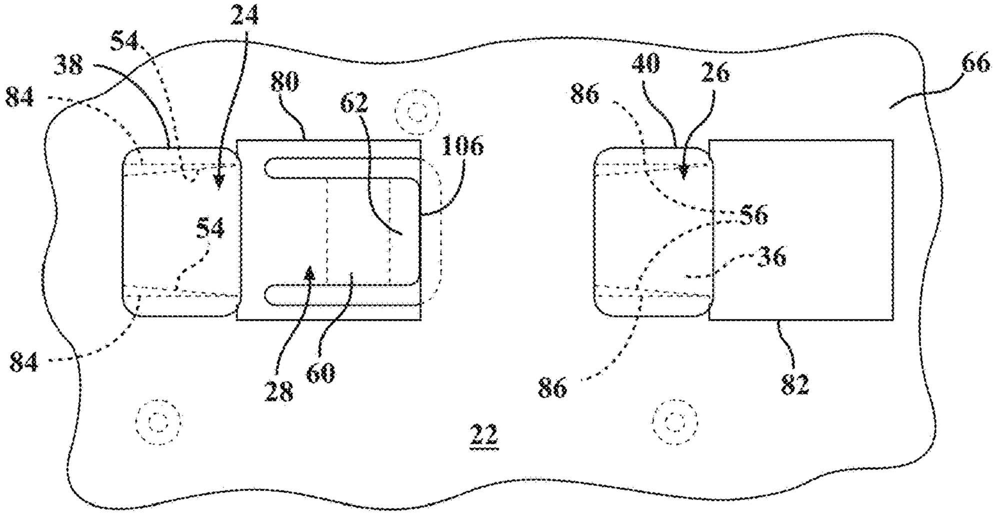
FIG. 16 is the lamp assembly of FIG. 14 with the mount posts repositioned to a matingly engaged position within the respective keyhole slots in the mounting bracket.

As shown in FIG. 15, as the mount posts 24, 26 continue to move into the locking portions 84, 86 of the keyhole slots 76, 78, the cantilevered lock 28 continues to contact the mounting wall 66. As shown in FIG. 16, when the mount posts 24, 26 are fully inserted into the locking portions 84, 86 of the keyhole slots 76, 78, the cantilevered lock 28 no longer contacts the mounting wall 66 and the spring bias in the cantilevered lock 28 snaps the locking tab 62 of the cantilevered lock 28 into the releasing portion 80. The cantilevered lock 28 is shown in an engaged condition with respect to the keyhole slot 76 in FIGS. 12, 13 and 16 with the locking tab 62 abutting and frictionally engaged with the end wall 106 of the keyhole slot 76. Longitudinal movement of the mount posts 24, 26 within the respective keyhole slots 76, 78 is restricted once the locking tab 62 engages with the end wall 106 of the keyhole slot 76. The cantilever ledges 38, 40 are sized and shaped such that they overlap with the mounting wall 66 adjacent the locking portions 84, 86 when the base portions 34, 36 are matingly engaged with the associated locking portions 84, 86, as shown in FIG. 16. Thus, while the cantilever ledges 38, 40 will pass through the releasing portions 80, 82 of the respective keyhole slots 76, 78, the cantilever ledges 38, 40 will not pass through the locking portions 84, 86 of the respective keyhole slots 76, 78.

The mounting wall 66 frictionally engages with both the cantilever ledges 38, 40 and the protrusions 30 to assure a tight fit and minimize movement of the lamp body 20 relative to the mounting wall 66. In addition, the tapered side walls 54, 56 of the base portions 34, 36 assure a tight fit with minimal lateral movement between the mount posts 24, 26 and the associated keyhole slots 76, 78. Further, the friction fit of the tapered side walls 54, 56 of the base portions 34, 36 of the mount posts 24, 26 in combination with the frictional engagement of locking tab 62 of the cantilevered lock 28 with the keyhole slot 76 minimizes longitudinal movement of the lamp body 20 with respect to the mounting wall 66. Thus, movement of the lamp body 20 with respect to the mounting wall 66 is minimized in three directions.

Figure 13:
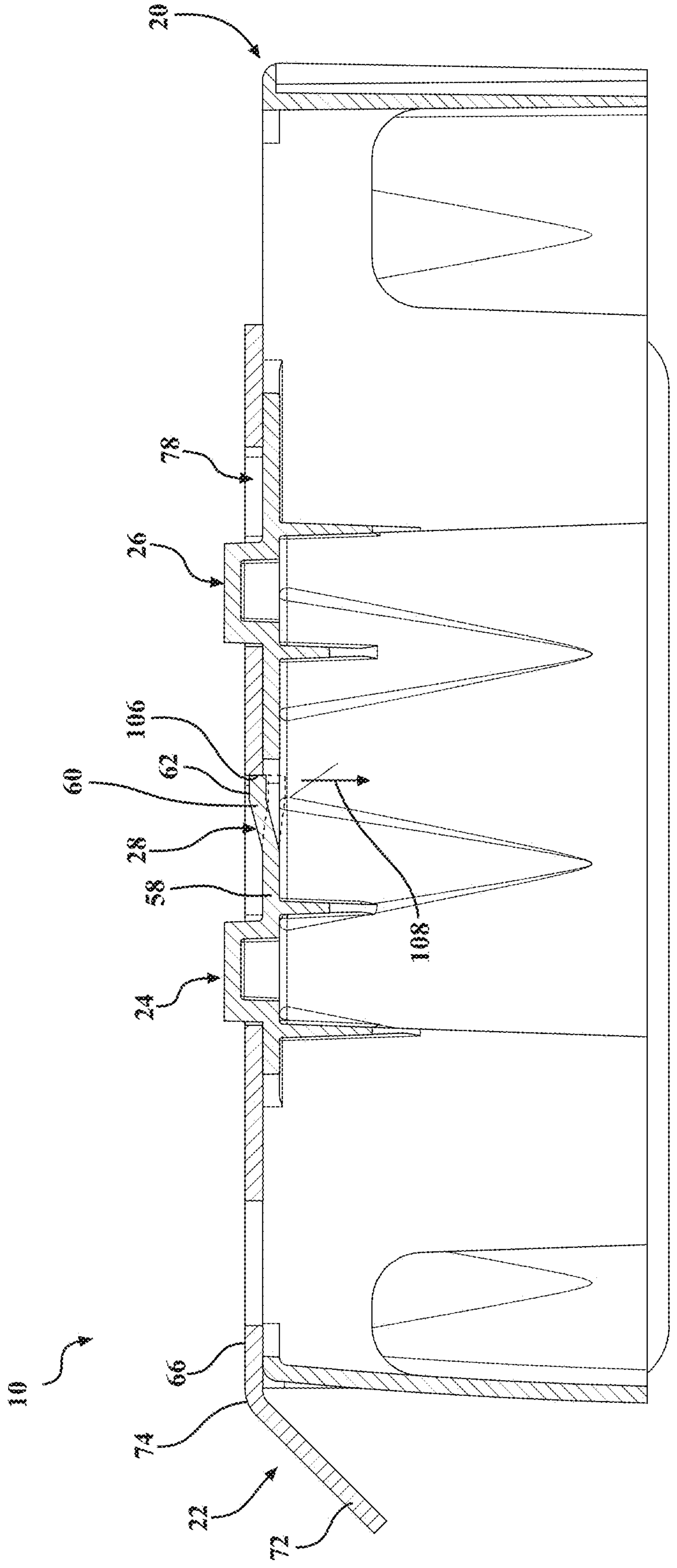
FIG. 13 is a cross-sectional view of the lamp assembly of FIG. 12 taken along section line 13-13.

The lamp body 20 may also be selectively decoupled from the mounting bracket 22. Referring to FIG. 13, when the cantilevered lock 28 is in the engaged condition, downward force (arrow 108) applied to the locking tab 62 disengages the cantilevered lock 28 so that the lamp body 20 can be decoupled from the mounting bracket 22 by sliding the lamp body 20 so that the mount posts 24, 26 move from the locking portions 84, 86 to the releasing portions 80, 82. The lamp body 20 can be fully decoupled from the mounting bracket 22 when the mount posts 24, 26 are aligned with the releasing portions 80, 82 of the keyhole slots 76, 78, as shown in FIGS. 11 and 14.

Figure 17:
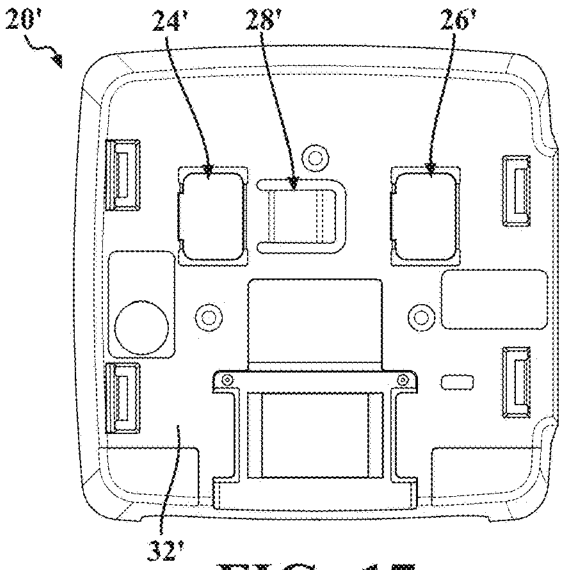
FIG. 17 is a rear view of a lamp body according to a second embodiment of the present invention.
Figure 18:
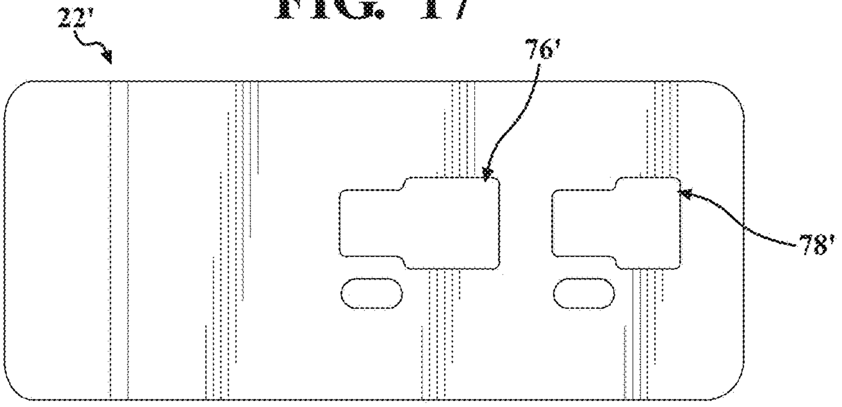
FIG. 18 is a rear view of a mounting bracket according to the second embodiment of the present invention.
Figure 19:
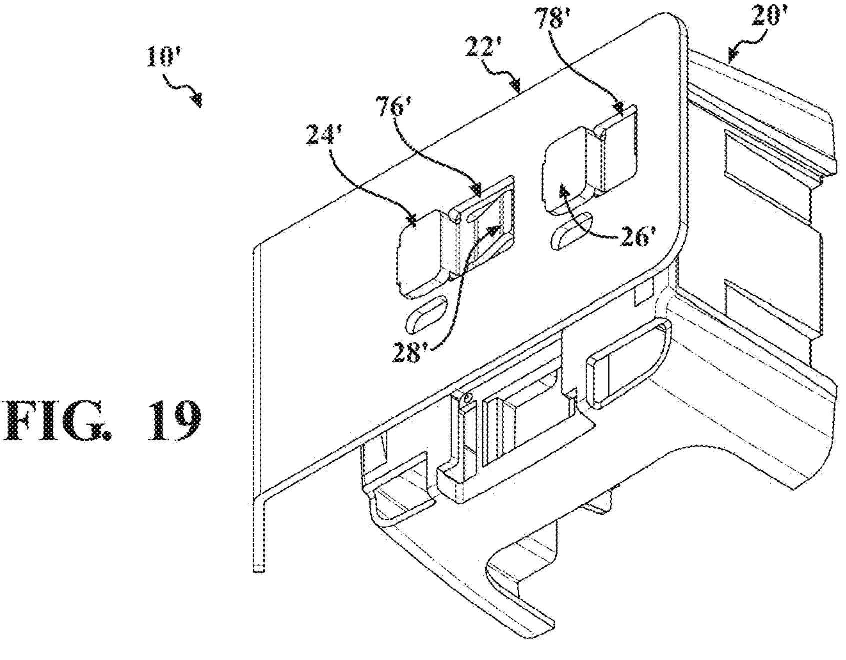
FIG. 19 is a perspective view of a lamp assembly according to the second embodiment of the present invention.
Figure 20:
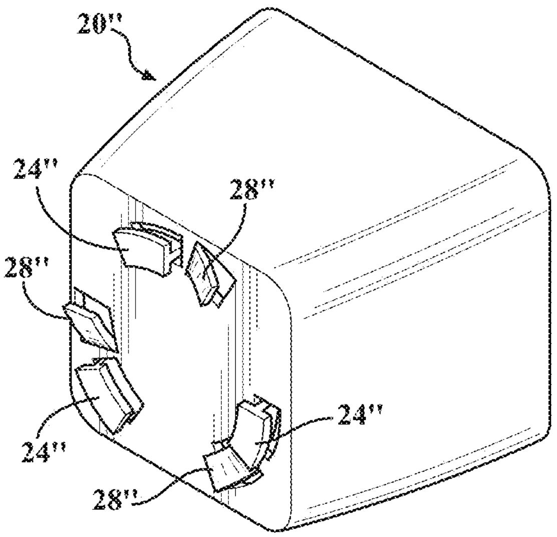
FIG. 20 is perspective view of a lamp body according to a third embodiment of the present invention.
Figure 21:
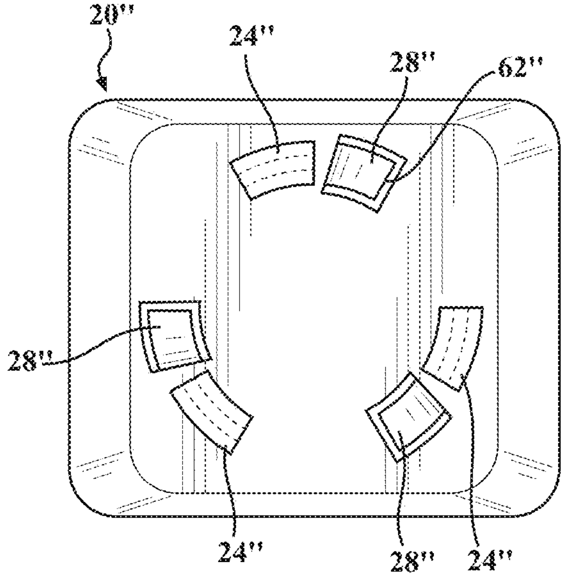
FIG. 21 is a rear view of the lamp body of FIG. 20.
Figure 22:
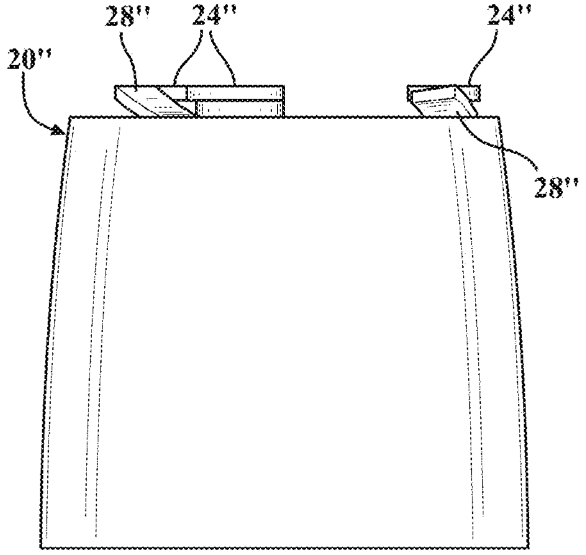
FIG. 22 is a side view of the lamp body of FIG. 20.
Figure 23:
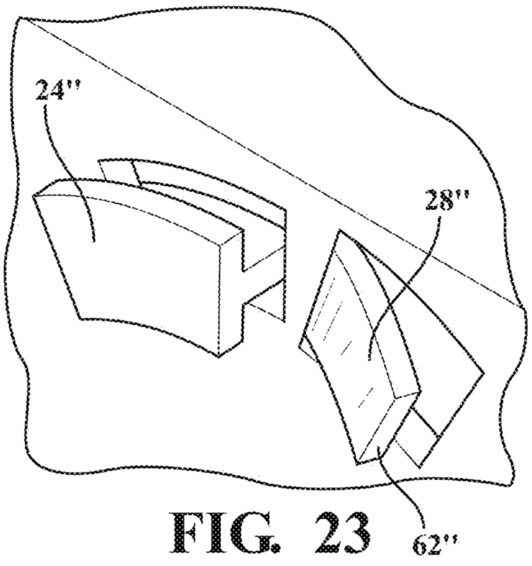
FIG. 23 is an enlarged view of a portion of the lamp body of FIG. 20.
Figure 24:
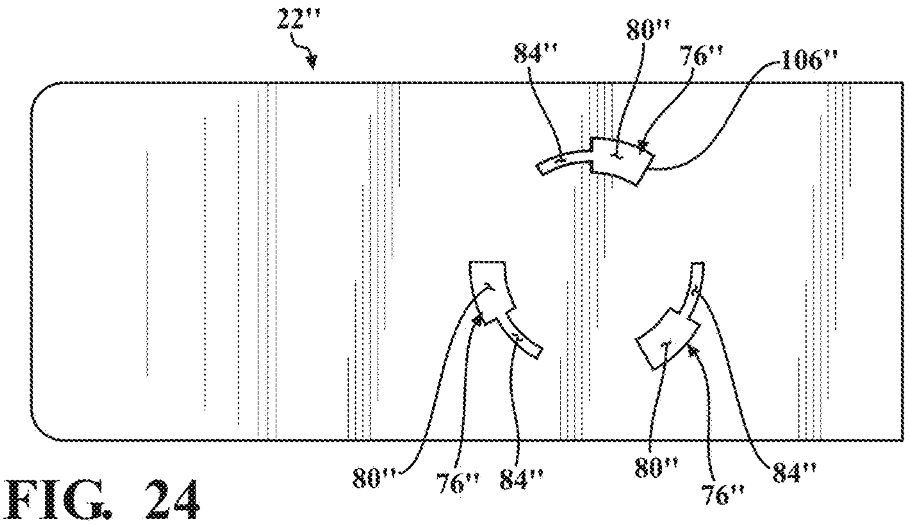
FIG. 24 is a rear view of a mounting bracket according to the third embodiment of the present invention.

A second embodiment of the lamp assembly 10' is shown in FIGS. 17-19, where like primed reference numerals represent similar elements as those described above. Only significant differences between the two embodiments are reflected in the Figures and the description below.

The lamp body 20' in the second embodiment includes spaced apart mount posts 24', 26' and the cantilever lock 28' projecting from the rear surface 32'. The mount posts 24', 26' and the cantilever lock 28' are configured to engage with respective keyhole slots 76', 78' in the mounting bracket 22', as shown in FIG. 19. As illustrated in FIGS. 17 and 18, the size and shape of the lamp body 20' and mounting bracket 22' can vary without altering the scope of invention.

A third embodiment of the lamp assembly 10" is shown in FIGS. 20-29, where like double primed reference numerals represent similar elements as those described above.

Only significant differences between the three embodiments are reflected in the Figures and the description below.

The lamp body 20" in the third embodiment includes three equally distanced arcuate-shaped mount posts 24" and three corresponding arcuate-shaped cantilevered locks 28". The mount posts 24" and cantilevered locks 28" are configured to engage with respective arcuate-shaped keyhole slots 76" in the mounting bracket 22". It will be understood that the number, size, shape, and spacing of the mount posts 24", cantilevered locks 28" and keyhole slots 76" can vary without altering the scope of the invention.

Figure 25:
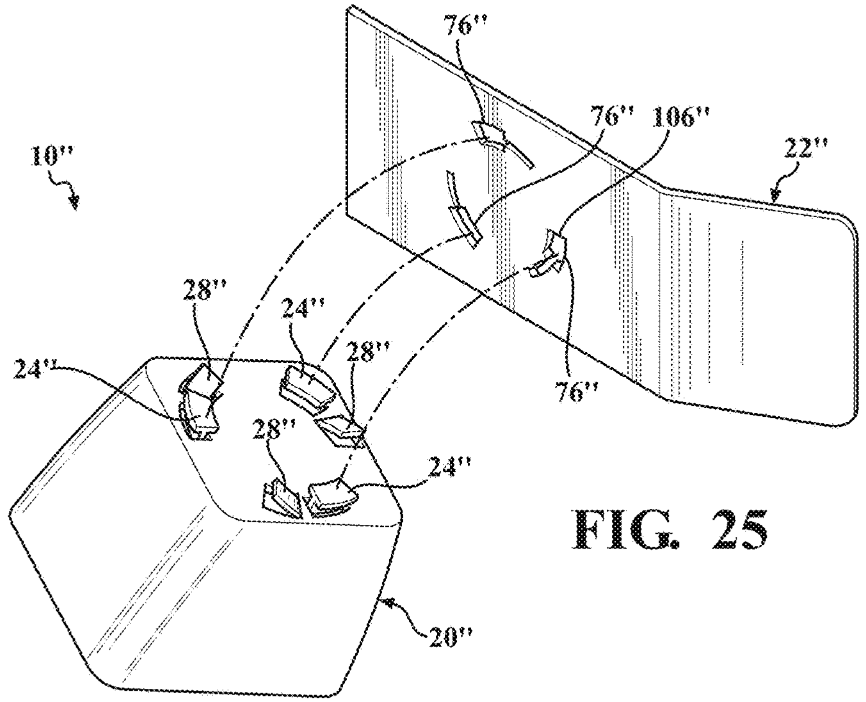
FIG. 25 is an exploded perspective view of the lamp assembly according to the third embodiment of the present invention before the lamp body is mounted on the mounting bracket.
Figure 26:
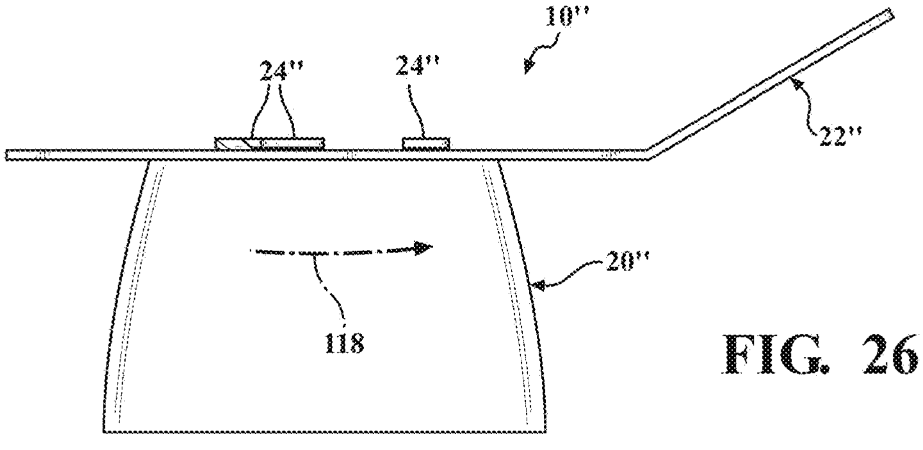
FIG. 26 is a top view of the lamp assembly of FIG. 25 with the lamp body partially mounted on the mounting bracket.
Figure 27:
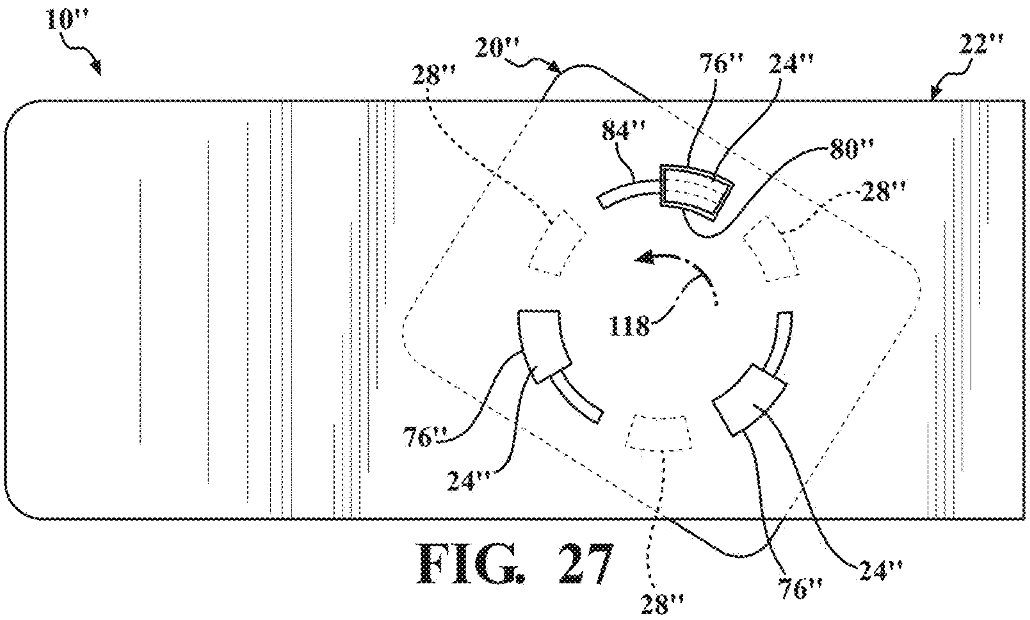
FIG. 27 is a rear view of the lamp assembly of FIG. 26.
Figure 28:
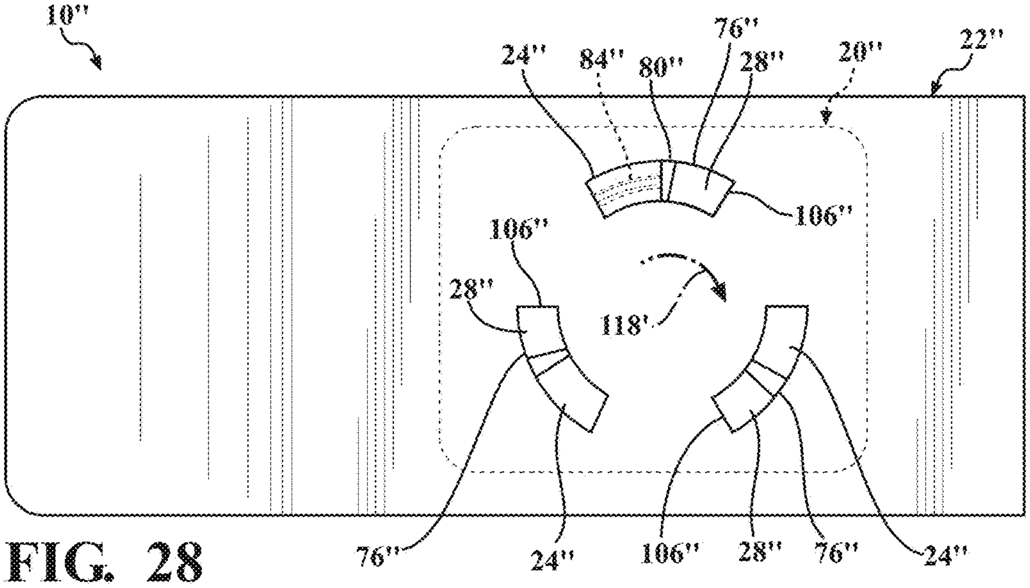
FIG. 28 is a rear view of the lamp assembly of FIG. 27, with the lamp body fully mounted on the mounting bracket.
Figure 29:
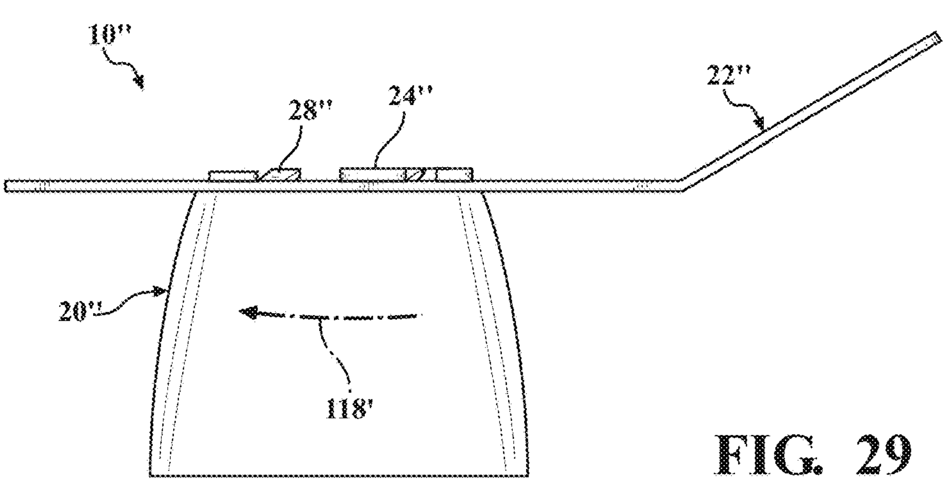
FIG. 29 is a top view of the lamp assembly of FIG. 28.

Referring to FIG. 25, to mount the lamp body 20" onto the mounting bracket 22", after the mount posts 24" are inserted into the releasing portions 80" of the keyhole slots 76", the lamp body 20" is rotated (see arrow 118 shown in FIGS. 26 and 27) until the mount posts 24" are fully inserted into the respective locking portions 84" of the keyhole slots 76" and the cantilevered locks 28" snap the locking tabs 62" into the releasing portions 80", as shown in FIGS. 28 and 29. Rotational movement of the mount posts 24" within the respective keyhole slots 76" is restricted once the locking tabs 62" engage with the end walls 106" of the respective keyhole slots 76".

Referring to FIGS. 28 and 29, to selectively decoupled the lamp body 20" from the mounting bracket 22", a downward force applied to the locking tabs 62" disengages the cantilevered locks 28" from the end walls 106" of the keyhole slots 76" allowing the lamp body 20" to be rotated in a clockwise direction (arrow 118') as viewed in FIG. 28 so that the mount posts 24" move from the locking portions 84" to the releasing portions 80". The lamp body 20" can be fully decoupled from the mounting bracket 22" when the mount posts 24" are aligned with the releasing portions 80" of the keyhole slots 76", as shown in FIG. 27.

Referring to FIGS. 30-39, a fourth embodiment of a lamp assembly 120 includes a lamp body 122 configured to be releasably coupled to a mounting bracket 124. Referring to FIGS. 30-33, the lamp body 122 includes a plurality of first and second snap features 126, 128 projecting from a rear surface 130. The plurality of first and second snap features 126, 128 are aligned in a row along a slot 132.

Figure 31:
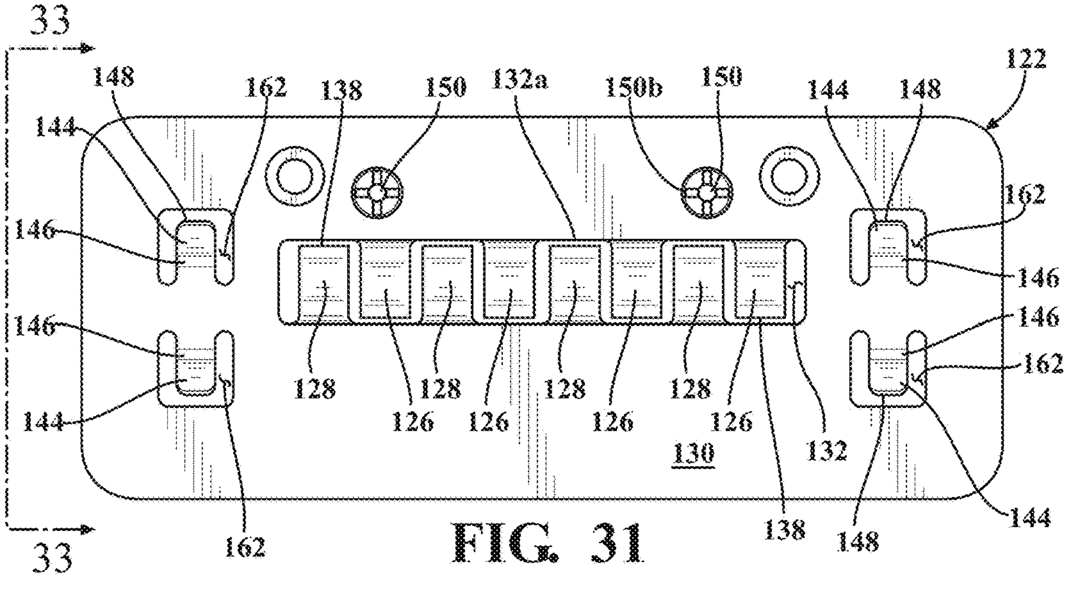
FIG. 31 is a rear view of the lamp body of FIG. 30.

As best shown in FIG. 31, the slot 132 extends in a longitudinal direction on the lamp body 122, and includes opposing first and second sides **132*a*, 132*b*. The first and second snap features 126, 128 are arranged in an alternating fashion along the slot 132 with the first snap features 126 projecting from the first side 132*a* of the slot 132, and the second snap features 128 projecting from the second side 132*b* of the slot 132**.

Figure 33:
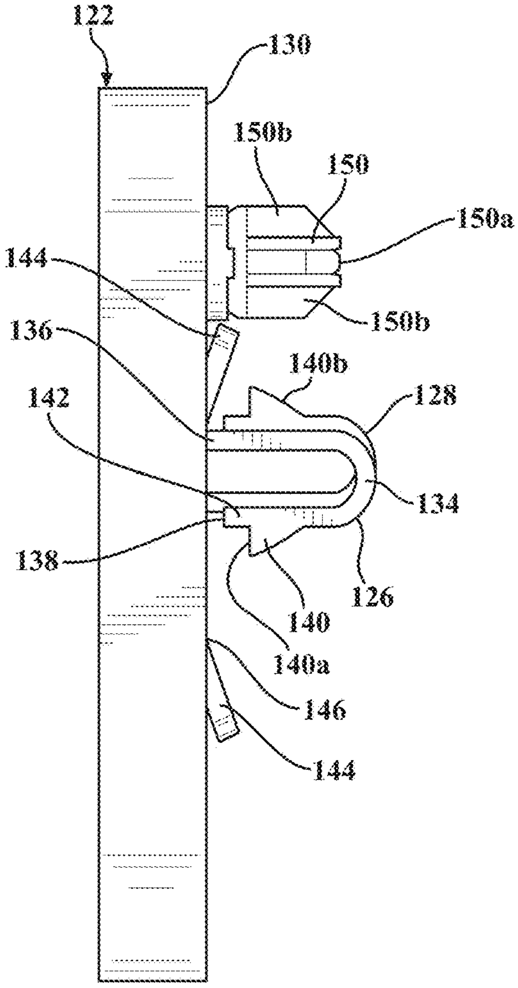
FIG. 33 is a side view of the lamp body of FIG. 30.

As best shown in FIG. 33, each of the first and second snap features 126, 128 includes a U-shaped portion 134 projecting from a base portion 136 and terminating at a tip 138 at a distal end. A latch 140 projects from the U-shaped portion 134 adjacent the tip 138 of the first and second snap features 126, 128. The latch 140 includes a latch surface **140*a* extending at approximately 90° angle from the U-shaped portion 134 and a lead-in surface 140*b* extending from the latch surface 140*a* to an outer surface of the U-shaped portion 134. The latch surface 140*a* is generally parallel to the rear surface 130 when the first and second snap features 126, 128 are unrestrained. Further, the latch surface 140*a* is spaced apart from the tip 138 of the first and second snap features 126, 128 with a lip 142 extending between the tip 138 and the latch surface 140*a*. It will be understood that the number, size, general shape, and spacing of the first and second snap features 126, 128** can vary without altering the scope of the invention.

Figure 30:
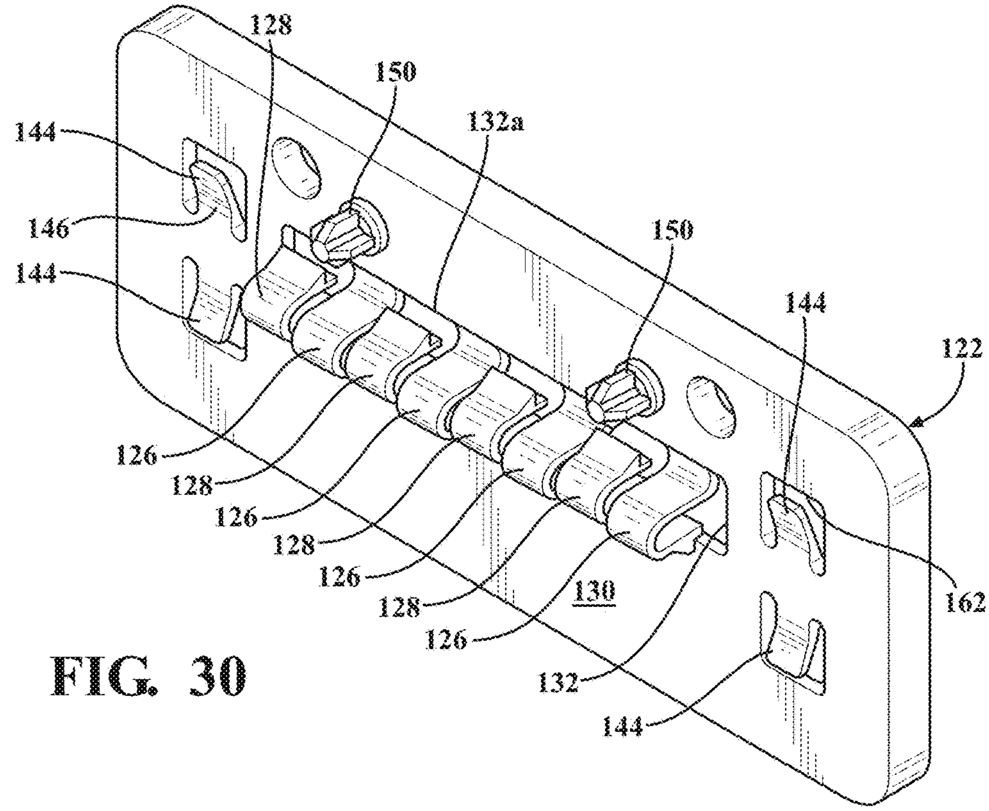
FIG. 30 is a perspective view of a lamp body, according to a fourth embodiment of the present invention.

Referring to FIGS. 30, 31 and 33, the lamp body 122 also includes bias tabs 144 integrally formed with the rear surface 130. Each bias tab 144 includes a hinge portion 146 extending from the rear surface 130 and projects at an angle to an opposite distal end 148. Referring to FIG. 31, the bias tabs 144 are arranged in pairs with the distal ends 148 of the bias tabs 144 facing away from each other. The pairs of bias tabs 144 are spaced longitudinally apart on the rear surface 130 with the slot 132 positioned between the pairs of bias tabs 144. It will be understood that the number, size, general shape, and spacing of the bias tabs 144 can vary without altering the scope of the invention.

Figure 32:
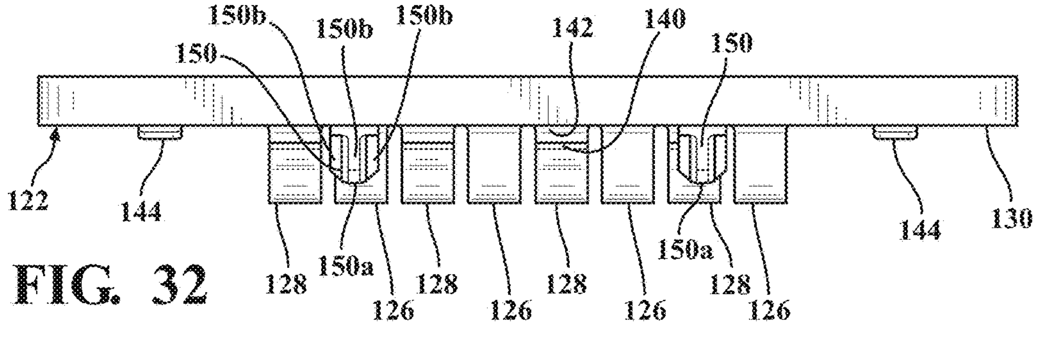
FIG. 32 is a top view of the lamp body of FIG. 30.

Referring to FIGS. 31-33, the lamp body 122 also includes alignment pins 150 spaced apart and projecting from the rear surface 130. Each alignment pin 150 has a generally cylindrical shape in profile with a conically shaped distal end **150*a*. Further, the alignment pins 150 include two pairs of opposing fins 150*b* projecting outward from a centerline of the alignment pin 150. Referring to FIG. 31, the alignment pins 150 are positioned between the slot 132 and an upper edge of the lamp body 122. It will be understood that the number, size, general shape, and spacing of the alignment pins 150** can vary without altering the scope of the invention.

Figure 34:
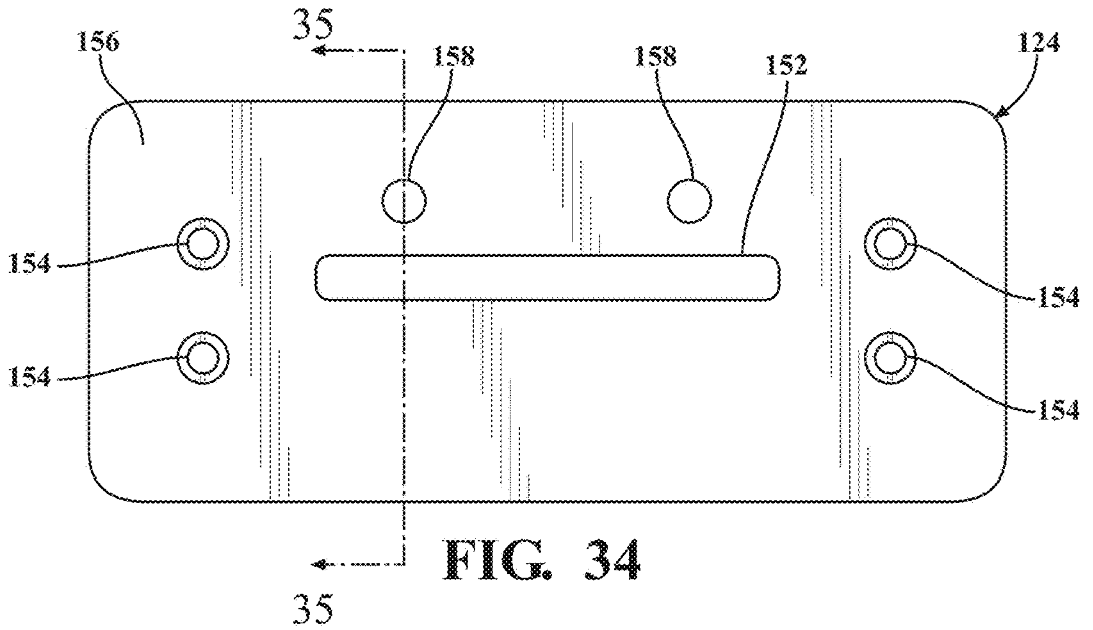
FIG. 34 is a front view of a mounting bracket, according to the fourth embodiment of the present invention.
Figure 35:
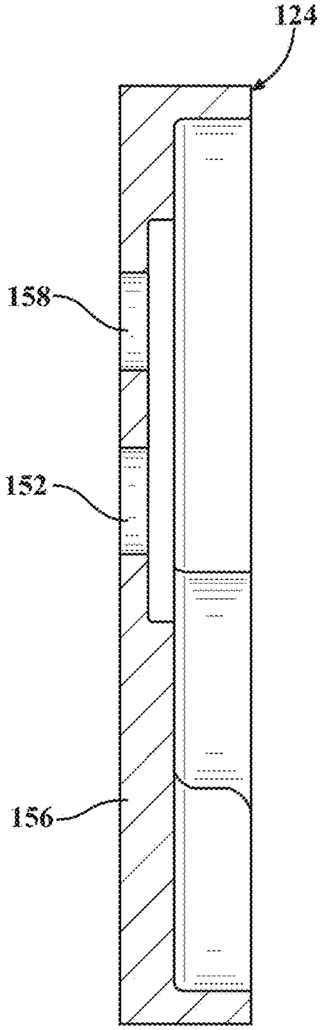
FIG. 35 is a cross-sectional view of the mounting bracket of FIG. 34 taken along section line 35-35.

Referring to FIGS. 34-35, the mounting bracket 124 includes an elongated mounting hole 152 extending through a mounting wall 156. The mounting bracket 124 may include apertures 154 configured to receive mechanical fasteners to mount the bracket 124 to a trailer frame 12. Alternatively, the mounting wall 156 may be integrally formed with a vehicle surface or a vehicle component to form a mounting surface on the vehicle/vehicle component without departing from the scope of the invention. The mounting bracket 124 also includes alignment holes 158 having a generally circular shape extending through the mounting wall 156. The alignment holes 158 are spaced apart from each other above the mounting hole 152. It will be understood that the mounting bracket 124 can include any number, general shape, and spacing of alignment holes 158 without departing from the scope of invention.

Figure 36:
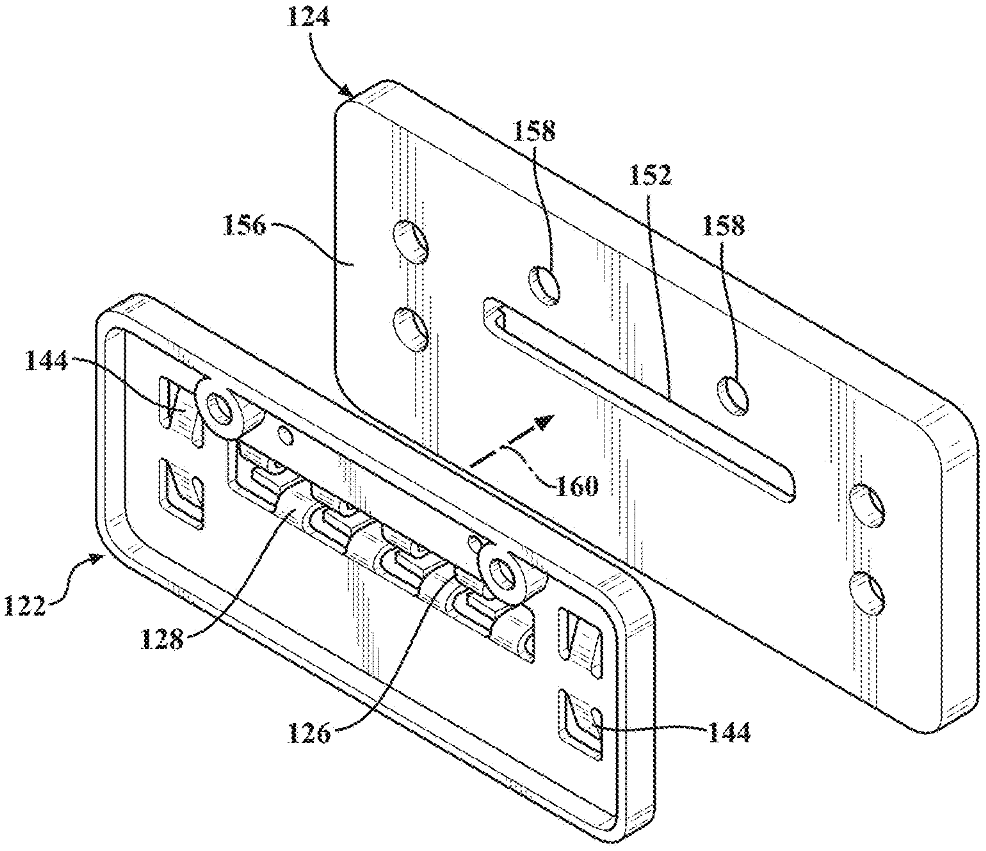
FIG. 36 is an exploded perspective view of the lamp assembly according to the fourth embodiment of the present invention before the lamp body is mounted on the mounting bracket.
Figure 37:
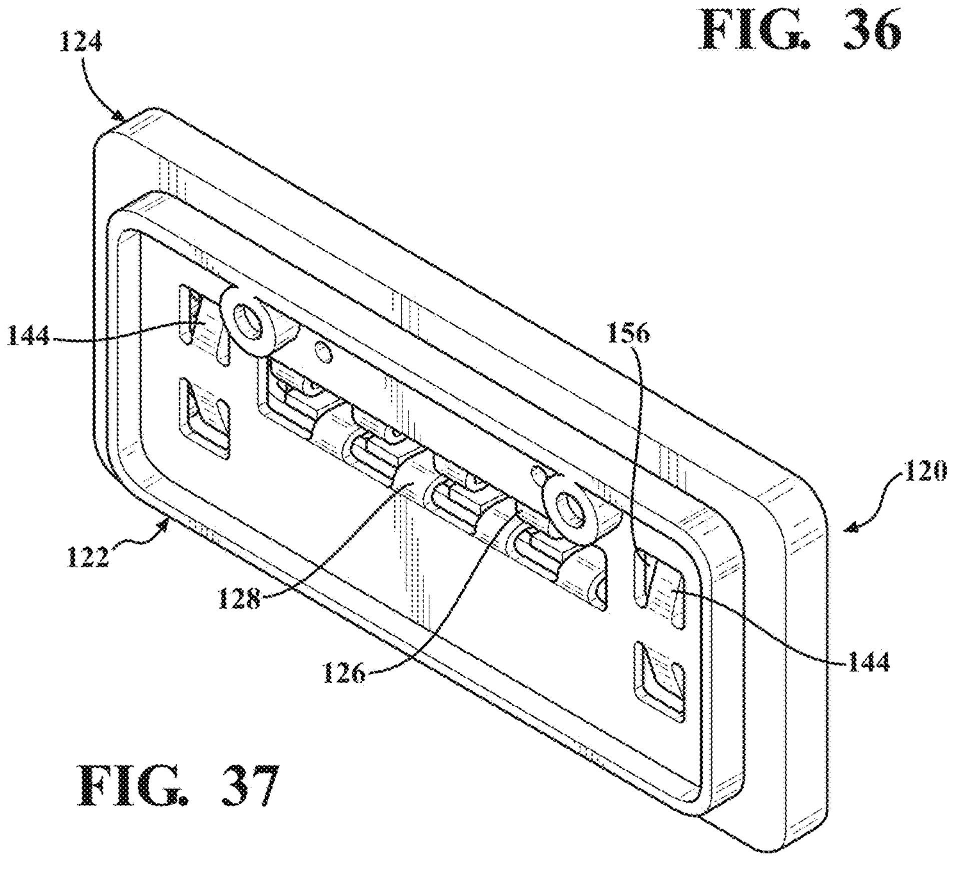
FIG. 37 is a perspective view of the lamp assembly of FIG. 36, with the lamp body fully mounted on the mounting bracket.
Figure 38:
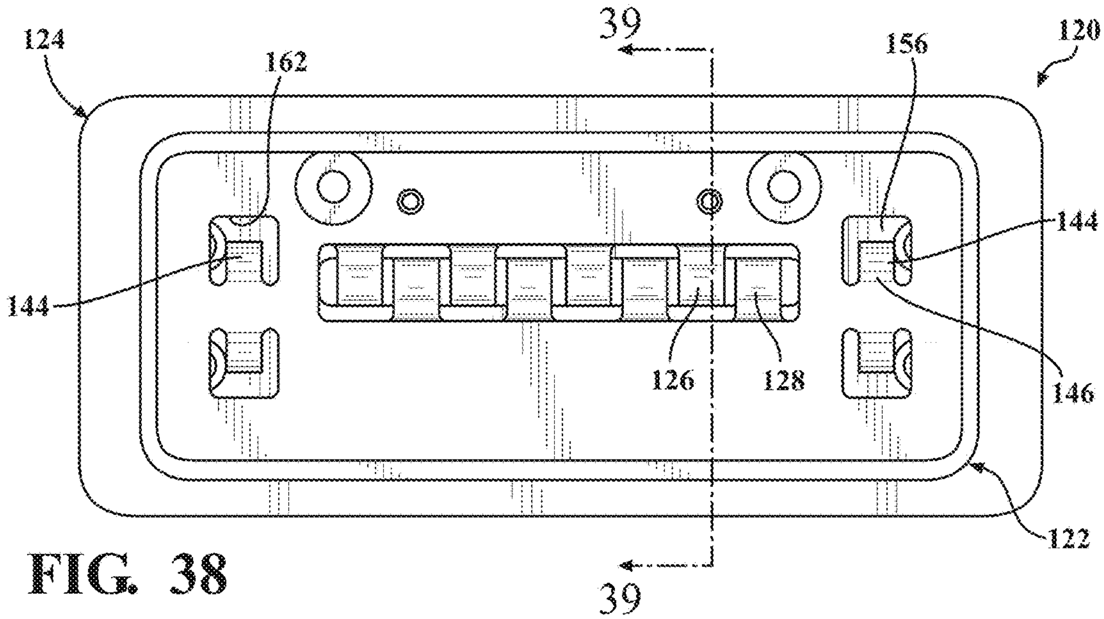
FIG. 38 is a front view of the lamp assembly of FIG. 37.
Figure 39:
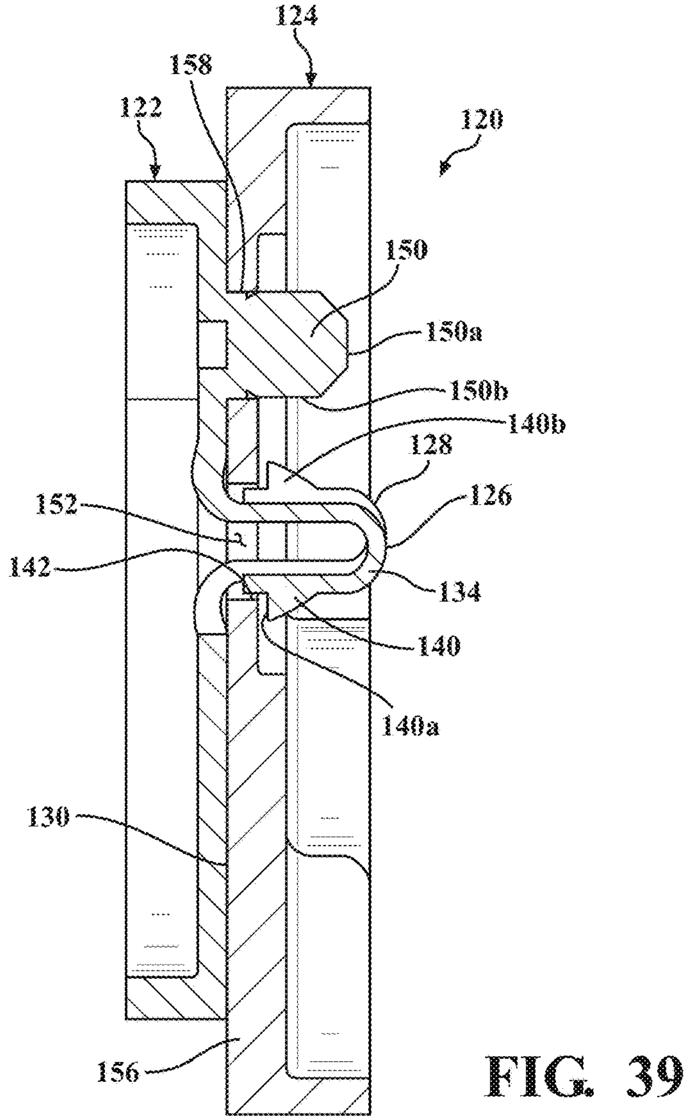
FIG. 39 is a cross-sectional view of the lamp assembly of FIG. 38 taken along section line 39-39.

Referring to FIG. 36, to mount the lamp body 122 onto the mounting bracket 124, the lamp body 122 is moved in the direction of arrow 160 towards the mounting bracket 124. Referring to FIGS. 37-39, the first and second snap features 126, 128 are inserted into the slot 132 in the lamp body 122 while the alignment pins 150 are inserted into the respective alignment holes 158 in the mounting bracket 124. The alignment pins 150 are sized and shaped such that the fins **150*b* frictionally engage with the alignment hole 158**.

The U-shaped portions 134 of the first and second snap features 126, 128 initially pass through the mounting hole 152 in the mounting bracket 124. When the latches 140 contact the mounting hole 152, the lead-in surfaces **140*b* flex the tips 138 of the U-shaped portions 134 inward which allows the latches 140 to pass through the mounting hole 152. The flexing of the U-shaped portions 134 induces a spring bias into the first and second snap features 126, 128. After the latch surface 140*a* passes through the mounting hole 152, the spring bias snaps the tips 138 of the U-shaped portions 134 outward, causing the lips 142 to be brought into frictional engagement with the adjacent first and second sides 132*a*, 132*b* of the slot 132, thereby locking the lamp body 122 onto the mounting bracket 124**.

Referring to FIG. 38, when the lamp body 122 is mounted on the mounting bracket 124, the bias tabs 144 flex towards the rear surface 130 and into a U-shaped slot 162, which induces a spring bias into the bias tabs 144. The spring bias biases the mounting wall 156 away from the mounting bracket 124.

Referring to FIG. 39, to selectively decoupled the lamp body 122 from the mounting bracket 124, the lead-in surfaces 140*b* of the first and second snap features 126, 128 are flexed towards the centerline of the mounting hole 152 to allow the latches 140 to pass through the mounting hole 152.

Figure 40:
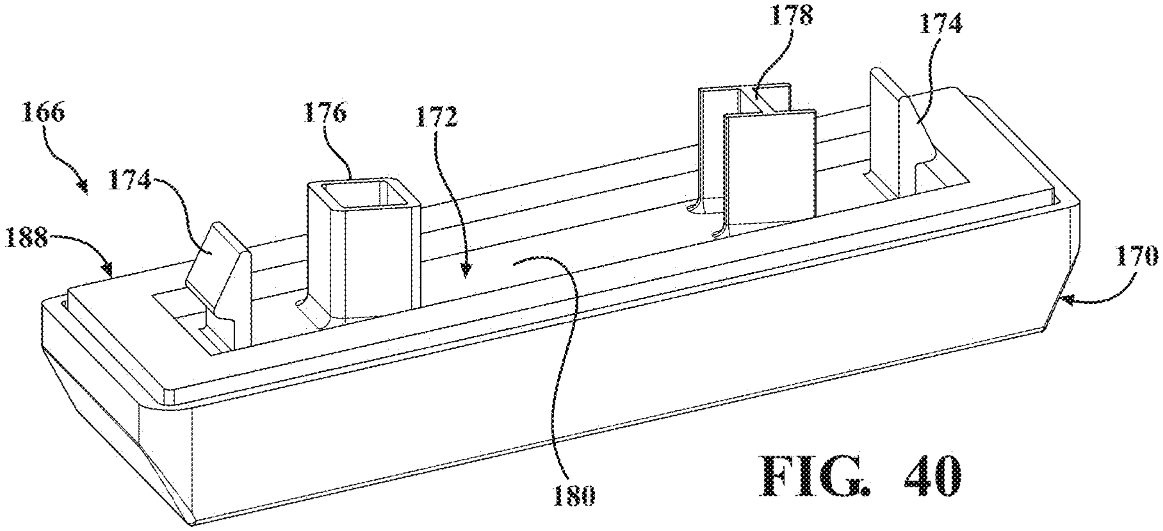
FIG. 40 is perspective view of a lamp body, according to a fifth embodiment of the present invention.
Figure 41:
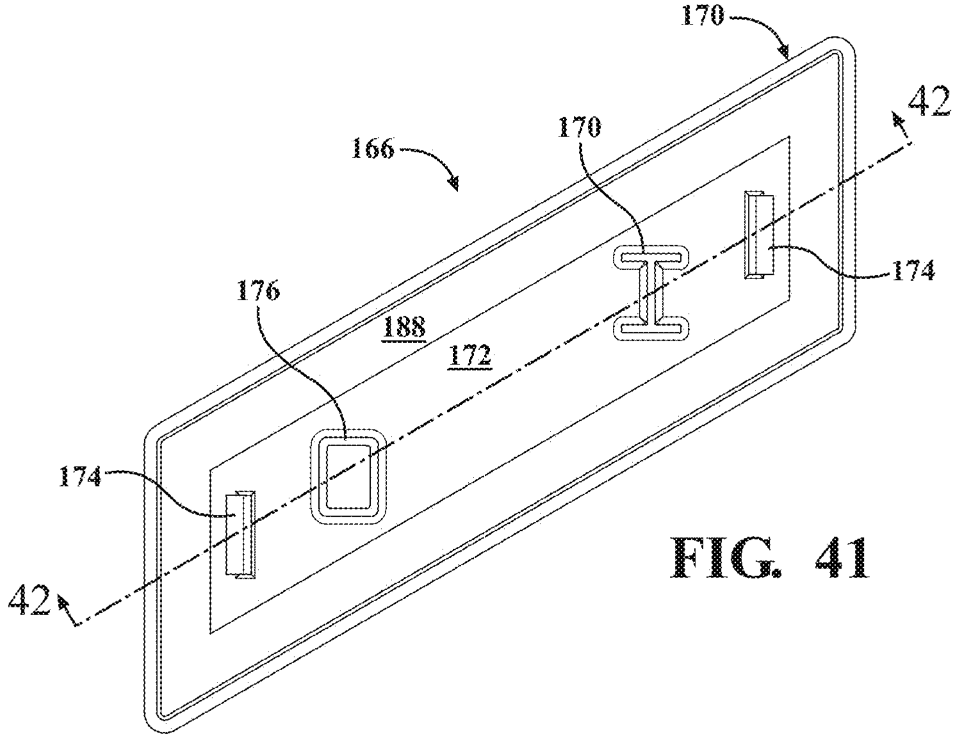
FIG. 41 is a rear view of the lamp body of FIG. 40.
Figure 42:
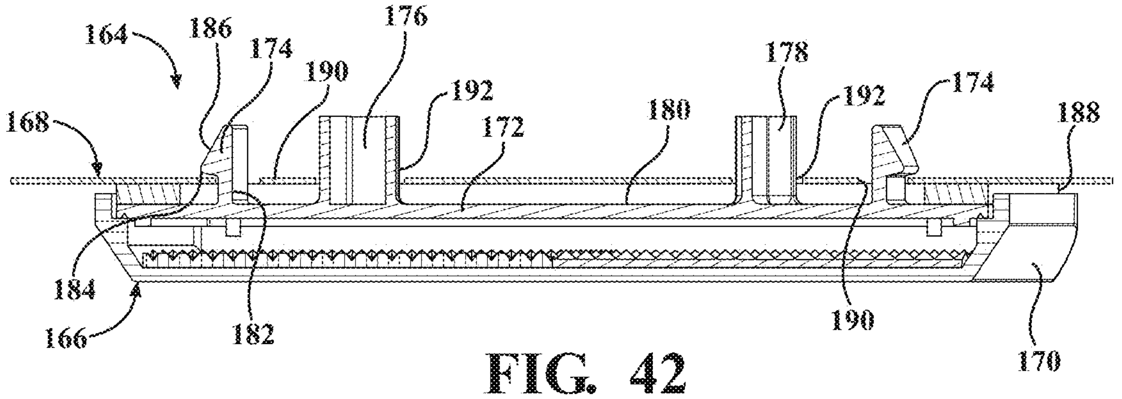
FIG. 42 is a cross-sectional view of the lamp body of FIG. 41 taken along line 42-42 after the lamp body is mounted on a mounting surface.

Referring to FIGS. 40-44, a fifth embodiment of a lamp assembly 164 includes a lamp body 166 configured to be releasably coupled to a mounting surface 168. The mounting surface 168 may be integrally formed on a mounting bracket configured to be fixedly coupled to a vehicle, or it may be integrally formed with a vehicle surface or a vehicle component. Referring to FIGS. 40-42, the lamp body 166 includes a lamp cover 170 fixedly coupled to a lamp base 172. The lamp base 172 includes a plurality of snap features 174 and locating features 176, 178 projecting from a rear surface 180 of the lamp base 172. As best shown in FIG. 42, each of the snap features 174 includes a base portion 182 extending at approximately 90° angle from the rear surface 180 of the lamp base 172, a latch 184 extending at approximately 90° angle from the base portion 182, and a lead-in surface 186 extending between the latch 184 and a distal end of the snap feature 174. It will be understood that the number, size, general shape, and spacing of the snap features 174 and the locating features 176, 178 can vary without altering the scope of the invention. The lamp body 166 also includes a compressible gasket 188 fixedly coupled to the lamp base 172 and extending around a periphery of the lamp base 172. The compressible gasket 188 is formed of a water resistant material such as a neoprene, as a non-limiting example.

Figure 43:
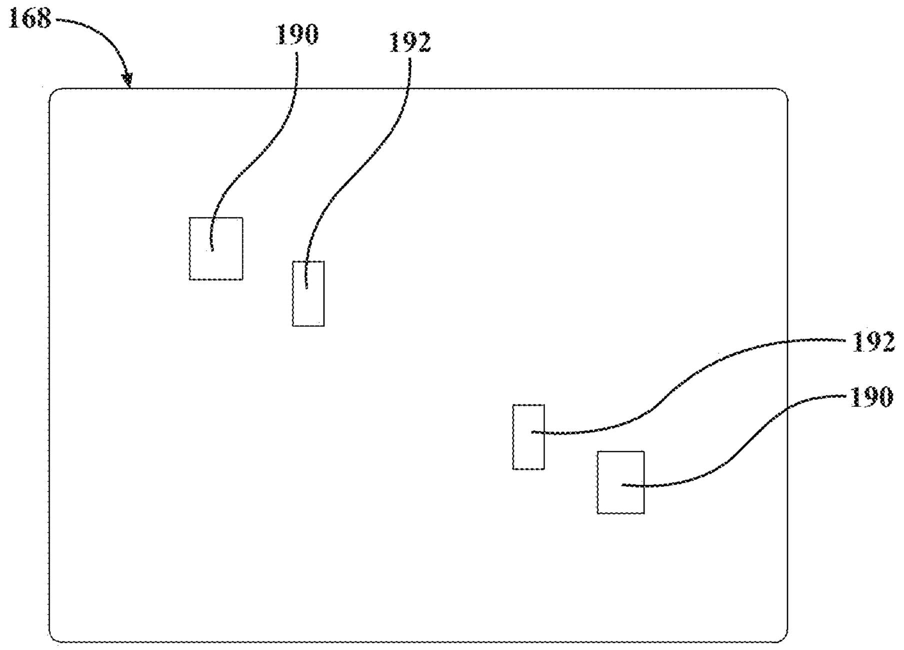
FIG. 43 is a front view of the mounting surface of FIG. 42, according to the fifth embodiment of the present invention.
Figure 44:
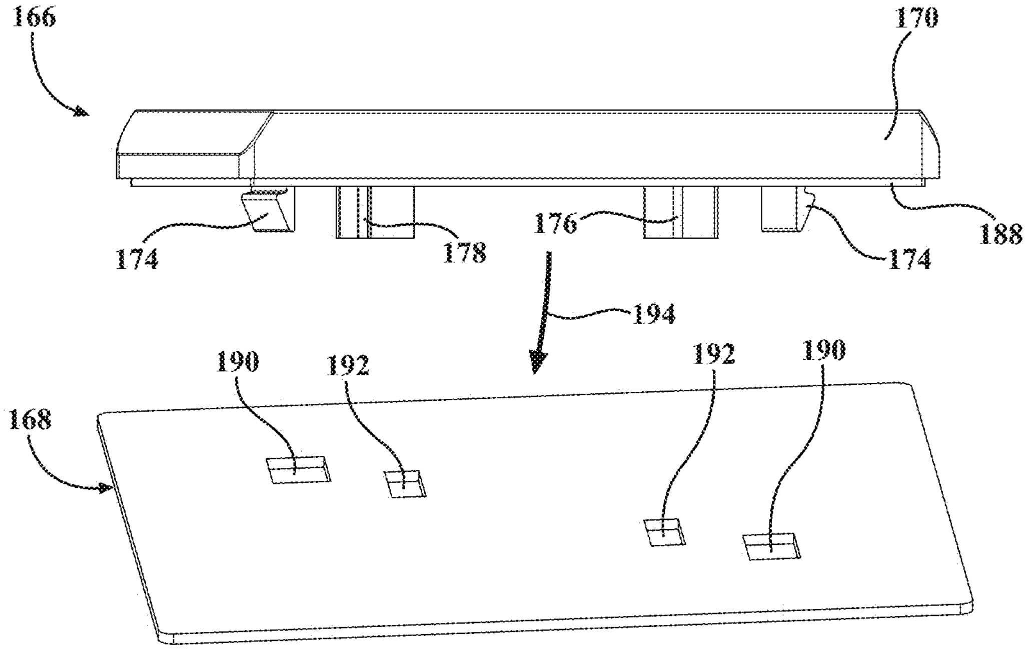
FIG. 44 is an exploded perspective of the lamp assembly according to the fifth embodiment of the present invention before the lamp body is mounted on the mounting surface.

Referring to FIGS. 42-44, the mounting surface 168 includes a plurality of mounting holes 190 and a plurality of alignment holes 192 extending through the mounting surface 168. It will be understood that the mounting surface 168 can include any number, general shape, and spacing of mounting holes 190 and alignment holes 192 without departing from the scope of the invention.

Referring to FIG. 44, to mount the lamp body 166 onto the mounting surface 168, the lamp body 166 is moved in the direction of arrow 194 towards the mounting surface 168. The snap features 174 are inserted into the respective mounting holes 190 in the mounting surface 168. In addition, the locating features 176, 178 are inserted into the respective alignment holes 192 in the mounting surface 168.

When the lead-in surfaces 186 of the snap features 174 contact the respective mounting holes 190 in the mounting surface 168, the lead-in surfaces 186 flex the distal ends of the snap features 174 inward which allows the latches 184 to pass through the mounting holes 190. The flexing of the base portions 182 of the snap features 174 induces a spring bias into the snap features 174. After the latch 184 passes through the mounting hole 190, the spring bias snaps the latch 184 outward, causing the latch 184 to be brought into frictional engagement with a rear side of the mounting surface 168, thereby locking the lamp body 166 onto the mounting surface 168. During installation, the gasket 188 is compressed between the lamp body 166 and the mounting surface 168 which induces a spring bias into the gasket 188. The spring bias in the gasket 188 biases the plurality of snap features 174 towards an engaged condition with the mounting surface 168. The gasket 188 prevents liquids from entering between the lamp body 166 and the mounting surface 168.

Referring to FIG. 42, to selectively decouple the lamp body 166 from the mounting surface 168, the lead-in surfaces 186 of the snap features 174 are flexed towards the centerline of the lamp body 166 to allow the latches 184 to pass through the respective mounting holes 190.

As discussed above, the lamp body 20, 20', 20", 122, 166 of the present invention can be securely mounted and dismounted from the mounting bracket 22, 22', 22", 124 and/or mounting surface 168 on a vehicle without the use of mechanical fasteners such as screws or bolts. The elimination of mechanical fasteners not only reduces the cost of the lamp assembly 10, but it reduces the complexity of assembling and disassembling the lamp assembly 10.

The invention has been described in an illustrative manner, and it is to be understood that the terminology, which has been used, is intended to be in the nature of words of description rather than of limitation. Many modifications and variations of the present invention are possible in lamp of the above teachings. It is, therefore, to be understood that within the scope of the appended claims, the invention may be practiced other than as specifically described.

What is claimed is:

1. A lamp body to be releasably coupled to a mounting bracket, the lamp body comprising:
- a rear surface; and
- a plurality of snap features projecting from the rear surface wherein:
  - the plurality of snap features is aligned in a row;
  - alternating snap features extend from opposite sides of the row; and
  - each snap feature is configured to releasably engage with a mounting hole in the mounting bracket.

2. The lamp body as set forth in claim 1, wherein each snap feature comprises:
- a U-shaped portion extending from the rear surface and terminating at a tip; and
- a latch projecting from the tip of the U-shaped portion, wherein the latch is configured to releasably engage with the mounting hole in the mounting bracket.

3. The lamp body as set forth in claim 1, further comprising an alignment pin projecting from the rear surface wherein the alignment pin is configured to frictionally engage with an alignment hole in the mounting bracket.

4. The lamp body as set forth in claim 1, further comprising a bias tab projecting from the rear surface wherein the bias tab is configured to bias the rear surface away from the mounting bracket.

5. The lamp body as set forth in claim 1, further comprising a gasket coupled to the rear surface and configured to prevent liquids from entering between the rear surface and the mounting bracket.

6. A lamp assembly comprising:
- a mounting bracket having a mounting hole; and
- a lamp body releasably coupled to the mounting bracket and having a rear surface and a plurality of snap features projecting from the rear surface, wherein each snap feature is configured to releasably engage with the mounting hole in the mounting bracket, and wherein each snap feature includes a U-shaped portion extending from the rear surface and terminating at a tip; and a latch projecting from the tip of the U-shaped portion, wherein the latch is configured to releasably engage with the mounting hole in the mounting bracket.

7. The lamp assembly as set forth in claim 6, wherein the plurality of snap features is aligned in a row and alternating snap features extend from opposite sides of the row.

8. The lamp assembly as set forth in claim 6, wherein each snap feature is configured to be selectively released from the mounting bracket for repair or replacement.

9. The lamp assembly as set forth in claim 6, wherein the mounting bracket further comprises an alignment hole, and the lamp body further comprises an alignment pin projecting from the rear surface, and wherein the alignment pin is configured to frictionally engage with the alignment hole.

10. The lamp assembly as set forth in claim 6, wherein the lamp body further comprises a bias tab projecting from the rear surface wherein the bias tab is configured to bias the rear surface away from the mounting bracket.

11. The lamp assembly as set forth in claim 6, wherein the lamp body further comprises a gasket coupled to the rear surface and configured to prevent liquids from entering between the rear surface and the mounting bracket.

12. The lamp assembly as set forth in claim 6, wherein the mounting bracket is integrally formed with a vehicle surface.

13. The lamp assembly as set forth in claim 6, wherein the mounting bracket is integrally formed with a mounting bracket.

* * * * *